United States Patent
Kondo et al.

(10) Patent No.: US 9,979,612 B2
(45) Date of Patent: May 22, 2018

(54) SERVER DEVICE, TERMINAL DEVICE, MAINTENANCE SERVICE INFORMATION TRANSMISSION METHOD AND NON-TRANSITORY COMPUTER-READABLE STORAGE MEDIUM

(71) Applicant: Panasonic Intellectual Property Corporation of America, Torrance, CA (US)

(72) Inventors: Kenji Kondo, Osaka (JP); Tomoaki Maruyama, Osaka (JP); Kotaro Sakata, Tokyo (JP); Hiroaki Yamamoto, Osaka (JP); Masayoshi Tojima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 116 days.

(21) Appl. No.: 14/423,141

(22) PCT Filed: Sep. 25, 2013

(86) PCT No.: PCT/JP2013/005662
§ 371 (c)(1),
(2) Date: Feb. 23, 2015

(87) PCT Pub. No.: WO2014/050089
PCT Pub. Date: Apr. 3, 2014

(65) Prior Publication Data
US 2015/0222476 A1 Aug. 6, 2015

Related U.S. Application Data

(60) Provisional application No. 61/706,402, filed on Sep. 27, 2012.

(30) Foreign Application Priority Data

Aug. 26, 2013 (JP) ................................. 2013-174412

(51) Int. Cl.
H04L 12/24 (2006.01)
G06Q 10/00 (2012.01)
H04L 12/28 (2006.01)

(52) U.S. Cl.
CPC ......... H04L 41/5061 (2013.01); G06Q 10/20 (2013.01); H04L 12/2825 (2013.01)

(58) Field of Classification Search
CPC ....... H04N 1/00209; H04N 2201/0017; H04N 1/0001; G06F 13/4291; G06F 11/1443; G06F 1/3221
USPC ........................................... 709/223; 370/241
See application file for complete search history.

(56) References Cited

U.S. PATENT DOCUMENTS 5,580,794 A * 12/1996 Allen .................... B01L 3/5023
422/404
6,199,018 B1 * 3/2001 Quist .................. G01M 13/028
318/806

(Continued)

FOREIGN PATENT DOCUMENTS

JP 2003-044126 2/2003
JP 2005-016871 1/2005

(Continued)

OTHER PUBLICATIONS

International Search Report dated Oct. 22, 2013 in International (PCT) Application No. PCT/JP2013/005662.

*Primary Examiner* — Tesfay Yohannes
(74) *Attorney, Agent, or Firm* — Wenderoth, Lind & Ponack, L.L.P.

(57) ABSTRACT

Provided is a server device capable of increasing the availability of a device by urging a user who uses the device to (Continued)

perform actions related to maintenance service. In this server device, an information transceiver receives operation information about a device. A remaining life determination unit determines the remaining life of the device or a component of the device based on the operation information. When the determined remaining life reaches a predetermined remaining life or becomes shorter than the predetermined remaining life, a transmission destination setting unit sets a device that is possessed by a person having a predetermined relationship with the user of the device as a transmission destination for the transmission of maintenance service information based on relationship information indicating the relationship between the user of the device and another person who is not the user. The information transceiver transmits the maintenance service information to the transmission destination.

18 Claims, 17 Drawing Sheets

(56) References Cited

U.S. PATENT DOCUMENTS

| | | | | |
|---|---|---|---|---|
| 7,568,075 | B2* | 7/2009 | Fujibayashi | G06F 3/0613 |
| | | | | 711/154 |
| 8,887,231 | B2* | 11/2014 | Wohlert | H04L 63/101 |
| | | | | 726/2 |
| 2002/0101346 | A1* | 8/2002 | Busick | B67D 3/0032 |
| | | | | 340/521 |
| 2004/0220778 | A1 | 11/2004 | Imai et al. | |
| 2005/0007249 | A1* | 1/2005 | Eryurek | G05B 23/027 |
| | | | | 340/511 |
| 2005/0216692 | A1* | 9/2005 | Watanabe | G06F 11/3433 |
| | | | | 711/170 |
| 2006/0240798 | A1* | 10/2006 | Jarosinski | H04B 1/1615 |
| | | | | 455/343.1 |
| 2007/0055840 | A1* | 3/2007 | Yamamoto | G06F 3/0613 |
| | | | | 711/165 |
| 2007/0091497 | A1* | 4/2007 | Mizuno | G06F 11/2221 |
| | | | | 360/51 |
| 2008/0243828 | A1* | 10/2008 | Reztlaff | G06F 17/30613 |
| 2009/0002258 | A1* | 1/2009 | Candal | H01Q 1/244 |
| | | | | 343/876 |
| 2010/0235007 | A1* | 9/2010 | Constien | G01R 31/3679 |
| | | | | 700/291 |
| 2011/0053614 | A1* | 3/2011 | Mishina | G01S 5/0009 |
| | | | | 455/456.6 |
| 2012/0099438 | A1* | 4/2012 | Wang | H04W 76/022 |
| | | | | 370/241 |

FOREIGN PATENT DOCUMENTS

| | | |
|---|---|---|
| JP | 2006-145053 | 6/2006 |
| JP | 2011-185547 | 9/2011 |
| WO | 2007/043099 | 4/2007 |

* cited by examiner

| USER ID | NAME | ADDRESS | MAIL ADDRESS | DESTINATION | CONCERNED USER ID | RELATIONSHIP |
|---|---|---|---|---|---|---|
| 11111 | SHIMAMOTO | NIIGATA PREFECTURE | aaa@aaa.co.jp | AAAAAA | 11423 | RELATIVE (FATHER – CHILD) |
| | | | | | 51534 | FRIEND |
| | | | | | 32325 | CUSTOMER – MAINTENANCE PROVIDER |
| | | | | | 12451 | COMMUNITY MEMBER |
| | | | | | ... | ... |
| 11112 | YAMAMOTO | HOKKAIDO | bbb@bbb.co.jp | BBBBBB | 41589 | RELATIVE (MOTHER – CHILD) |
| ... | ... | ... | ... | ... | ... | ... |
| 11423 | SHIMAMOTO | TOKYO | ccc@ccc.co.jp | CCCCCC | 11111 | RELATIVE (CHILD – FATHER) |
| ... | ... | ... | ... | ... | ... | ... |

| USER ID | DEVICE ID | REMAINING LIFE INFORMATION ||||| PRIVACY SETTING INFORMATION ||
| | | PART ID | LIFE (h) | OPERATING TIME (h) | REMAINING LIFE (h) | SHARER | SHARED CONTENTS |
|---|---|---|---|---|---|---|---|
| 11111 | HA-AIR 1304 | AC1251 | 150000 | 100000 | 50000 | RELATIVE | PRODUCT IMAGE & TARGET PART (RELATIVE), |
| | | CP9840 | 100000 | 100000 | 0 | FRIEND | PRODUCT ILLUSTRATION & TARGET PART (FRIEND), |
| | | ... | ... | ... | ... | COMMUNITY MEMBER | PRODUCT NUMBER & TARGET PART (COMMUNITY MEMBER) |
| | | | | | | MAINTENANCE PROVIDER | |
| | ... | ... | ... | ... | ... | ... | ... |
| 11112 | TA-SIR 9910 | TA1202 | 80000 | 75000 | 5000 | RELATIVE | PRODUCT ILLUSTRATION & TARGET PART (RELATIVE) |
| | | ... | ... | ... | ... | MAINTENANCE PROVIDER | |
| | ... | ... | ... | ... | ... | ... | ... |
| ... | ... | ... | ... | ... | ... | ... | ... |

SERVER DEVICE, TERMINAL DEVICE, MAINTENANCE SERVICE INFORMATION TRANSMISSION METHOD AND NON-TRANSITORY COMPUTER-READABLE STORAGE MEDIUM

TECHNICAL FIELD

The present invention relates to a server apparatus, a terminal apparatus, a maintenance information transmission method and a computer program that indicate maintenance information relating to maintenance of a device.

BACKGROUND ART

Conventionally, there have been proposed home appliance management systems which predict maintenance and a remaining life of a home appliance from accumulated operation data when the home appliance is operated, and indicate, to a user who use the home appliance, a maintenance period and the predicted life as time information useful in daily life, thereby making it possible to link this information to preventive maintenance in device management.

For example, PTL 1 discloses a control apparatus of a home appliance that displays that the life of a part making up the home appliance comes to an end. PTL 2 discloses a home appliance that counts an accumulated use time when attachment of a consumable item is detected and makes an announcement when the accumulated use time exceeds a predetermined life time. Furthermore, PTL 3 discloses a network home appliance that indicates a predicted lifetime to a management server when an elapsed time or total accumulated operation time reaches a predetermined range or predetermined reference compared to an average life or the like.

CITATION LIST

Patent Literature

PTL 1
Japanese Patent Application Laid-Open No. 2005-16871
PTL 2
Japanese Patent Application Laid-Open No. 2006-145053
PTL 3
WO 2007/043099

SUMMARY OF INVENTION

Technical Problem

However, even when the related art in aforementioned PTLs 1 to 3 is used, there is a problem in that it is not always easy to motivate users of home appliances to take action associated with maintenance of the home appliances. More specifically, even if it is indicated to the user that the life of a home appliance reaches its end, this does not necessarily mean that the home appliance may suddenly become unavailable, and thus the user is likely to continue to use the home appliance.

In such a case, if the home appliance suddenly breaks down, the user can no longer use the home appliance until it is repaired or until the user purchases a new one, which causes inconvenience in the user's life.

In view of such circumstances, how to motivate users of home appliances to take action associated with maintenance and improve the availability of the home appliances is being recognized as an important issue.

An object of the present invention is to provide a server apparatus, a terminal apparatus, a maintenance information transmission method and a computer program capable of motivating users of home appliances to take action associated with maintenance and thereby improving the availability of the home appliances.

Solution to Problem

A server apparatus according to an aspect of the present invention includes: an information receiving section that receives operation information of a first device; a storage section that stores the operation information and stores relationship information indicating a relationship between a user of the first device and a person other than the user; a remaining life determining section that reads the operation information from the storage section and determines a remaining life of the first device or a part making up the first device based on the read operation information; a transmission destination determining section that reads the relationship information from the storage section, searches for, when the remaining life determined by the remaining life determining section reaches a predetermined remaining life or becomes shorter than a predetermined remaining life, a person concerned who has a predetermined relationship with the user of the first device among the people other than the user, based on the relationship information, and determines a second device owned by the person concerned as a transmission destination to which maintenance information of the first device is transmitted; and an information transmitting section that transmits the maintenance information to the transmission destination determined by the transmission destination determining section.

A terminal apparatus according to an aspect of the present invention includes: an information receiving section that receives, when a remaining life of a first device reaches a predetermined remaining life or becomes shorter than a predetermined remaining life, maintenance information of the first device whose transmission destination is determined, based on relationship information indicating a relationship between a user of the first device and a person other than the user, to be an apparatus owned by a person concerned having a predetermined relationship with the user of the first device among the people other than the user; a storage section that stores the maintenance information received by the information receiving section; an information processing section that reads the maintenance information from the storage section; and an indication section that outputs the maintenance information read by the information processing section.

A maintenance information transmission method according to an aspect of the present invention includes: receiving operation information of a first device; reading the operation information from a storage section that stores the operation information and stores relationship information indicating a relationship between a user of the first device and a person other than the user and determining a remaining life of the first device or a part making up the first device based on the read operation information; reading the relationship information from the storage section, searching for, when the remaining life determined in the determining of the remaining life reaches a predetermined remaining life or becomes shorter than a predetermined remaining life, a person concerned who has a predetermined relationship with the user of the first device among the people other than the user, based on the relationship information and determining a second device owned by the person concerned as a transmission destination to which maintenance information of the first device is transmitted; and transmitting the maintenance information to the transmission destination determined in the determining of the transmission destination.

A computer program according to an aspect of the present invention is a program that causes a computer to execute processing including: receiving operation information of a first device; reading the operation information from a storage section that stores the operation information and stores relationship information indicating a relationship between a user of the first device and a person other than the user and determining a remaining life of the first device or a part making up the first device based on the read operation information; reading the relationship information from the storage section, searching for, when the remaining life determined in the determining of the remaining life reaches a predetermined remaining life or becomes shorter than a predetermined remaining life, a person concerned who has a predetermined relationship with the user of the first device among the people other than the user, based on the relationship information and determining a second device owned by the person concerned as a transmission destination to which maintenance information of the first device is transmitted; and transmitting the maintenance information to the transmission destination determined in the determining of the transmission destination.

Advantageous Effects of Invention

According to the present invention, it is possible to motivate a user who uses a device to take action associated with maintenance and thereby improve availability of the device.

BRIEF DESCRIPTION OF DRAWINGS

FIG. 7 is a diagram illustrating an example of relationship information;

FIG. 8 is a diagram illustrating an example of remaining life management information;

DESCRIPTION OF EMBODIMENTS

Hereinafter, embodiments of the present invention will be described in detail with reference to the accompanying drawings.

(Overview of Services Provided)

Figure 1A:
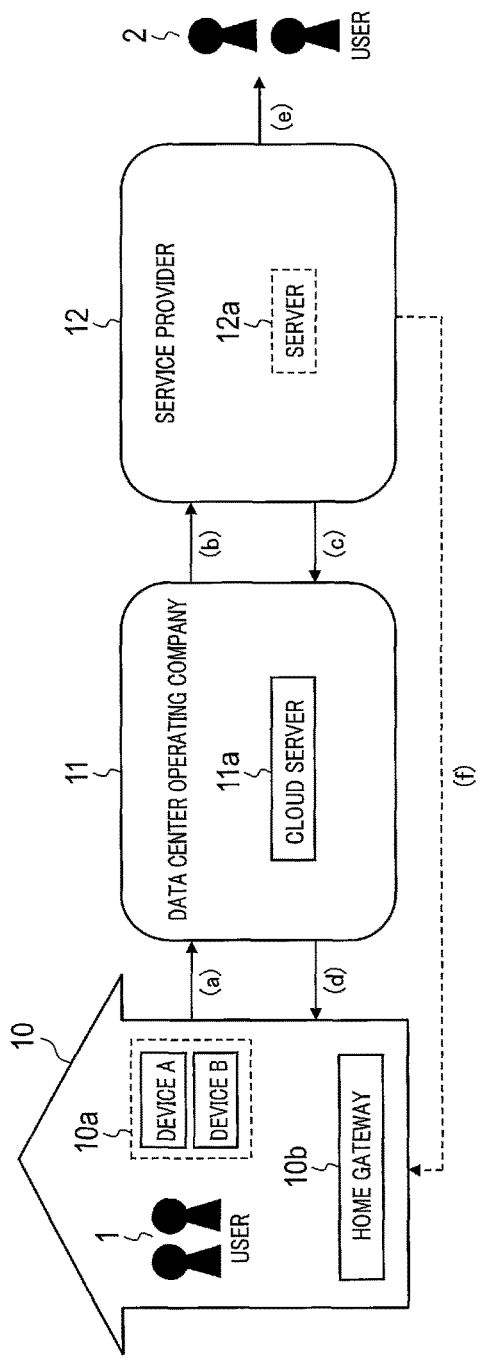
FIGS. 1A to 1C illustrate an overview of a device life indication system according to an embodiment.
Figure 1C:
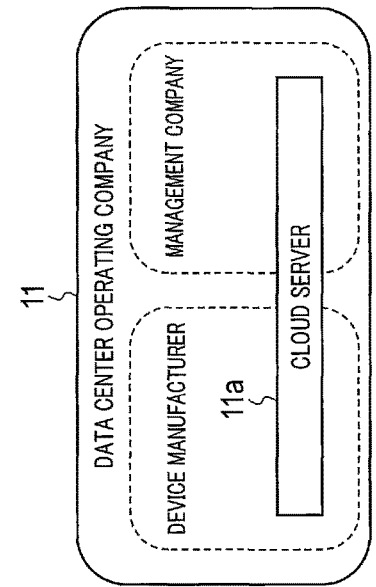
Figure 1B:
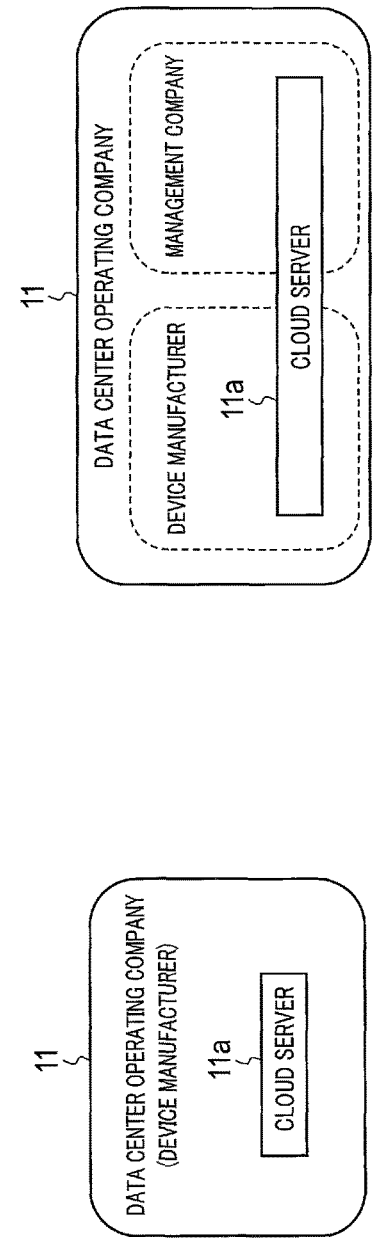

FIGS. 1A to 1C illustrate an overview of a device life indication system according to the present embodiment. FIG. 1A shows an overview of the device life indication system according to the present embodiment. Group 10 is, for example, a corporation, organization or household, whatever the scale is. Group 10 includes a plurality of devices 10a such as device A and device B, and home gateway 10b.

Among the plurality of devices 10a, there are devices accessible to the Internet (e.g., smartphone, PC or TV) and devices not accessible to the Internet with their systems alone (e.g., lighting equipment, washing machine, and refrigerator). There may be devices which are not accessible to the Internet with their systems alone but are made accessible to the Internet via home gateway 10b. Group 10 also includes user 1 who uses the plurality of devices 10a.

Data center operating company 11 includes cloud server 11a. Cloud server 11a is a virtual server that cooperates with various devices via the Internet. Cloud server 11a mainly manages a huge amount of data (big data) that cannot be handled by a normal database management tool or the like. Data center operating company 11 performs data management, management of cloud server 11a or operation of a data center that performs such management. Details of operations executed by data center operating company 11 will be described later.

Here, data center operating company 11 is not limited to a company that only performs data management or operation of cloud server 11a or the like. For example, when a device manufacturer developing/manufacturing one of the plurality of devices 10a is also engaged in data management or management of cloud server 11a or the like, the device manufacturer corresponds to data center operating company 11 (FIG. 1B).

Data center operating company 11 is not limited to one company. For example, when a device manufacturer and another management company are jointly performing or sharing data management or operation of cloud server 11a, suppose both or one of the companies correspond(s) to data center operating company 11 (FIG. 1C).

Service provider 12 owns server 12a. Server 12a referred to here includes, for example, a memory or the like in a personal PC, whatever the scale is. There may also be cases where the service provider owns no server 12a.

In the above service, home gateway 10b is not mandatory. For example, when cloud server 11a is performing whole data management, home gateway 10b is unnecessary. There may also be cases where there are no devices that are not accessible to the Internet with their systems alone in such a case that all devices in a household are accessible to the Internet.

Next, an information flow in the above service will be described. First, device A or device B of group 10 transmits each log information item to cloud server 11*a* of data center operating company 11. Cloud server 11*a* collects log information of device A or device B ((a) in FIG. 1A).

Here, the log information is, for example, information indicating an operation situation or operation date and time or the like of the plurality of devices 10*a*. The log information is, for example, television viewing history, recorder recording reservation information, operation date and time of a washing machine, volume of laundry, opening/closing date and time of a refrigerator, the number of times the refrigerator is opened/closed. The log information is not restricted to this, but the log information refers to all kinds of information that can be obtained from all types of devices.

The log information may be directly supplied to cloud server 11*a* from the plurality of devices 10*a* themselves via the Internet. The log information may be temporarily collected from the plurality of devices 10*a* to home gateway 10*b* and supplied from home gateway 10*b* to cloud server 11*a*.

Next, cloud server 11*a* of data center operating company 11 supplies the collected log information to service provider 12 in certain units. The unit here may be a unit in which information collected by the data center operating company is organized and supplied to service provider 12 or a unit requested by service provider 12. Although the unit is described here a certain unit, the unit may not be a fixed one but the amount of information supplied may change according to the situation.

The log information is stored in server 12*a* owned by service provider 12 as required ((b) in FIG. 1A). Service provider 12 then organizes the log information into information suitable for a service for the user and provides the log information to the user. The user who receives the service may be user 1 who uses the plurality of devices 10*a* or may be outside user 2.

Regarding the method of providing a service to the user, the service may be directly provided to the user from service provider 12, for example ((f) and (e) in FIG. 1A). Alternatively, the service may be provided to the user via, for example, cloud server 11*a* of data center operating company 11 again ((c) and (d) in FIG. 1A). Cloud server 11*a* of data center operating company 11 may organize the log information into information suitable for a service for the user and provide the service to service provider 12.

User 1 and user 2 may be different people or an identical person.

Embodiment 1

Figure 2:
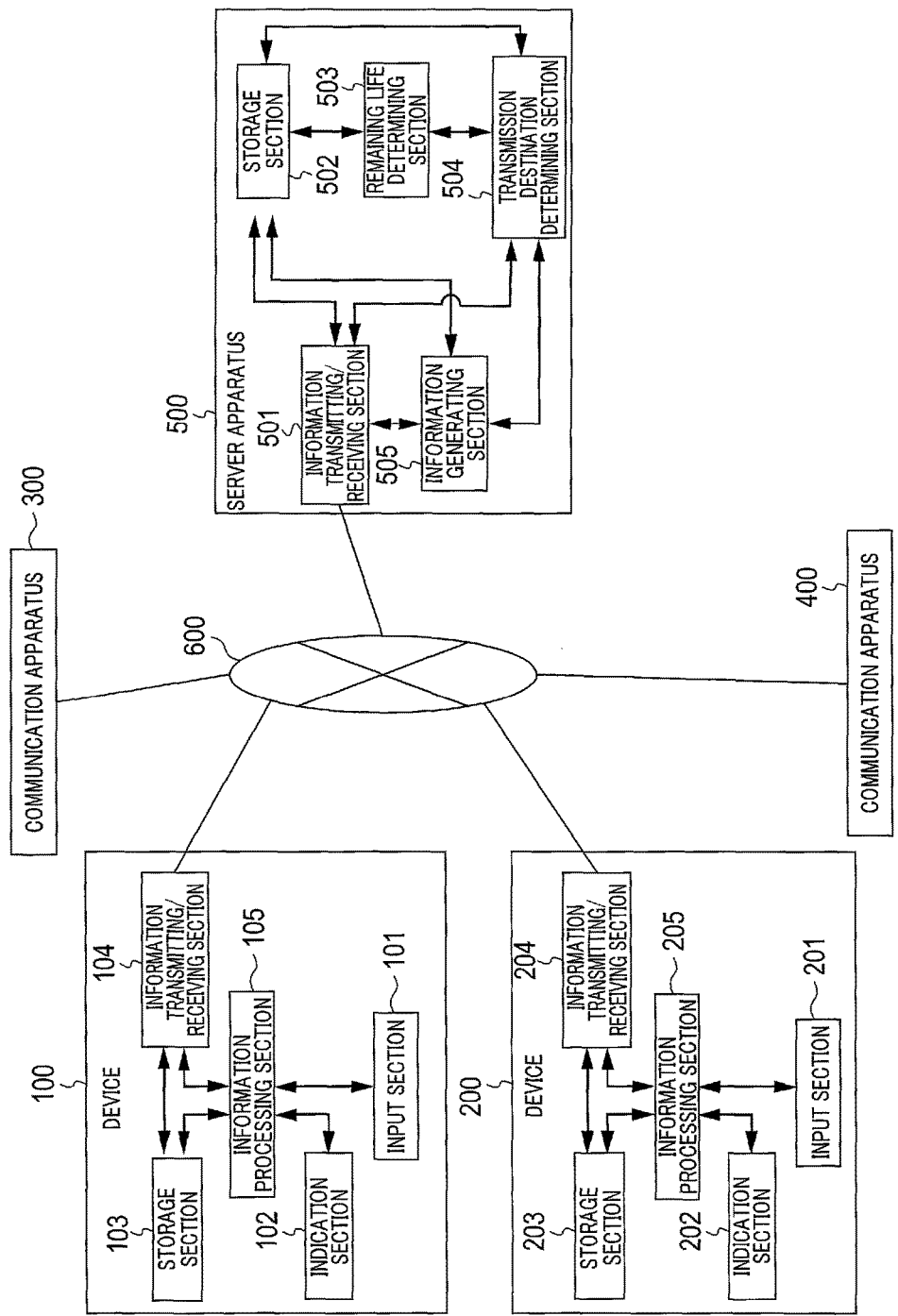
FIG. 2 is a block diagram illustrating a configuration of the device life indication system according to Embodiment 1 of the present invention.

FIG. 2 is a block diagram illustrating a configuration of a device life indication system according to Embodiment 1 of the present invention. As shown in FIG. 2, this system is constructed of device 100, device 200, communication apparatus 300, communication apparatus 400 and server apparatus 500 connected together via network 600. Network 600 may be a wired network or wireless network. A wired network and a wireless network may exist together.

FIG. 2 shows only two devices and two communication apparatuses but the number of the respective devices or apparatuses may be two or more. The description hereinafter will be based on the assumption that the user of device 200 is a person concerned having a predetermined relationship with the user of device 100.

Device 100 and device 200 include various devices and systems. Examples of the devices and systems include home appliances such as television, air conditioner, refrigerator, vacuum cleaner, air cleaner, electric toothbrush or dryer, information terminals such as personal computer, cellular phone, smartphone or tablet, sensor apparatuses such as blood glucose level sensor apparatus, and all kinds of devices and systems for a toilet, bathroom, mirror and illumination or the like.

Device 100 is provided with input section 101, indication section 102, storage section 103, information transmitting/receiving section 104 and information processing section 105. On the other hand, device 200 is provided with input section 201, indication section 202, storage section 203, information transmitting/receiving section 204 and information processing section 205.

Here, input section 101 and input section 201, indication section 102 and indication section 202, storage section 103 and storage section 203, information transmitting/receiving section 104 and information transmitting/receiving section 204, information processing section 105 and information processing section 205 are functional sections that provide similar functions. Therefore, input section 101, indication section 102, storage section 103, information transmitting/receiving section 104 and information processing section 105 will be described hereinafter and description of input section 201, indication section 202, storage section 203, information transmitting/receiving section 204 and information processing section 205 will be omitted.

Input section 101 is an input device such as a button or touch panel. Indication section 102 is a display device such as a display. Storage section 103 is a storage device such as a memory or hard disk apparatus.

Storage section 103 stores operation information of device 100. The operation information is information such as a device ID or part ID of device 100, operation time of device 100, operation time of each part (operation time after replacement in the case of a replaced part), manipulation history, operation history and maintenance history. This operation information is transmitted to server apparatus 500.

Storage section 103 stores maintenance information received from server apparatus 500. The maintenance information refers to information for prompting maintenance of device 100 or a part of device 100. This maintenance information is displayed by indication section 102. Indication section 102 described here displays maintenance information, but indication section 102 may also output maintenance information as audio using a speaker or the like.

Figure 3A:
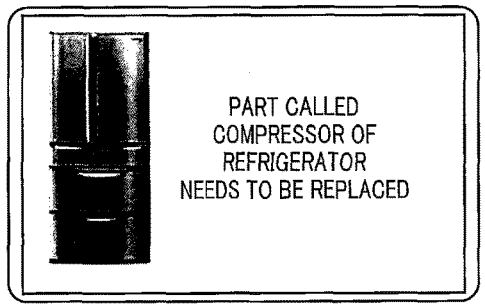
FIGS. 3A to 3E are diagrams illustrating examples of display screens of maintenance information.
Figure 3B:
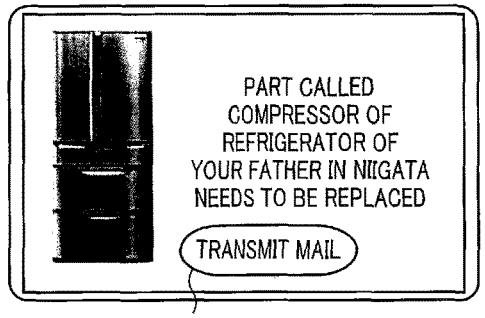
Figure 3C:
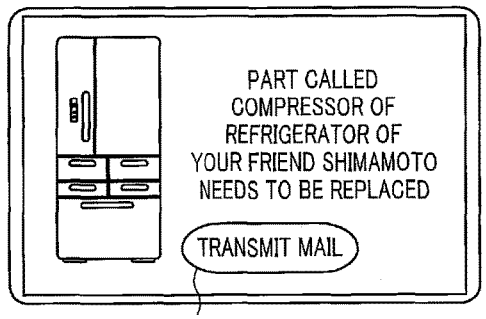
Figure 3D:
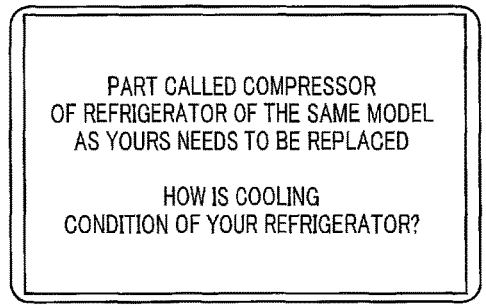
Figure 3E:
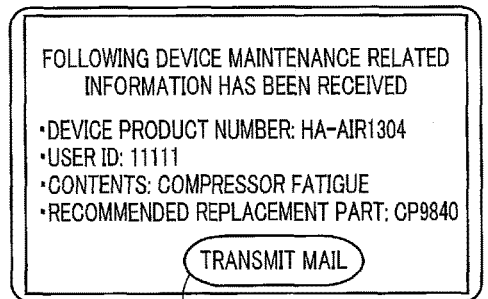

FIGS. 3A to 3E are diagrams illustrating examples of display screens of maintenance information. FIG. 3A illustrates maintenance information displayed to be indicated to the user of device 100. FIG. 3B illustrates maintenance information displayed to be indicated to a relative (child) of the user of device 100. FIG. 3C illustrates maintenance information displayed to be indicated to a friend of the user of device 100. FIG. 3D illustrates maintenance information displayed to be indicated to members of a user community of the same model as that of device 100. FIG. 3E illustrates maintenance information displayed to be indicated to a maintenance provider of device 100.

The relative (child), friend of the user of device 100, maintenance provider or the like in the cases of FIG. 3B, FIG. 3C and FIG. 3E have a strong relationship with the user of device 100 and can be said to be people holding strong influence on the user of device 100.

Thus, indicating the maintenance information to these people and asking them to recommend the user of device 100 to perform maintenance makes it possible to more reliably motivate the user to take action associated with maintenance. This can also improve the availability of device 100.

Mail transmission buttons 700, 701 and 702 are displayed on the screens shown in, FIG. 3B, FIG. 3C and FIG. 3E. Pressing mail transmission button 700, 701 or 702 causes a mail transmission function of device 200 to be activated. Information processing section 205 generates an electronic mail whose destination is set to a mail address of the user of device 100.

Here, server apparatus 500 includes information on the mail address of the maintenance provider in the maintenance information. Information processing section 205 generates the electronic mail using this information. The user of device 200 transmits the electronic mail with a message added thereto and can thereby easily recommend the user of device 100 to perform maintenance.

Note that when mail transmission button 700, 701 or 702 is pressed, information processing section 205 may generate an electronic mail whose destination is set to the mail address of the user of device 100 and including a predetermined message and information transmitting/receiving section 204 may transmit the electronic mail without modification.

On the other hand, in the case of FIG. 3D, each member of the user community is indicated that time has come to replace a part of a device of another member to thereby call attention of the member of the user community to parts of the device of the member. This can also motivate the user to take action associated with maintenance and improve the availability of the device.

Returning to the description in FIG. 2, information transmitting/receiving section 104 is a communication interface section that transmits information to another apparatus and receives information transmitted from the other apparatus. For example, information transmitting/receiving section 104 transmits the aforementioned operation information to server apparatus 500 and receives maintenance information transmitted from server apparatus 500.

Note that information transmitting/receiving section 104 may transmit operation information to server apparatus 500 via communication apparatus 300 or receive maintenance information from server apparatus 500 via communication apparatus 300.

Information processing section 105 is a control device such as a processor that executes various kinds of information processing. For example, information processing section 105 stores operation information of device 100 in storage section 103, periodically reads the operation information from storage section 103 and transmits the operation information to server apparatus 500 via information transmitting/receiving section 104. Information processing section 105 stores the maintenance information received from server apparatus 500 in storage section 103 and causes indication section 102 to display the maintenance information.

Communication apparatus 300 and communication apparatus 400 are communication apparatuses such as smartphones or tablet type communication apparatuses or controllers. Here, let us suppose that the user of communication apparatus 300 is identical to the user of device 100 and the user of communication apparatus 400 is identical to the user of device 200.

Communication apparatus 300 is provided with an input device such as a touch panel or button, a display device such as a display and a communication device that communicates with another apparatus (not shown).

For example, communication apparatus 300 displays a privacy setting screen for restricting the transmission destination of maintenance information and contents disclosed in the maintenance information, and receives an input relating to a privacy setting from the user. Communication apparatus 300 transmits the privacy setting information to server apparatus 500. Since communication apparatus 400 also has functions similar to those of communication apparatus 300, description thereof will be omitted here.

Figure 4A:
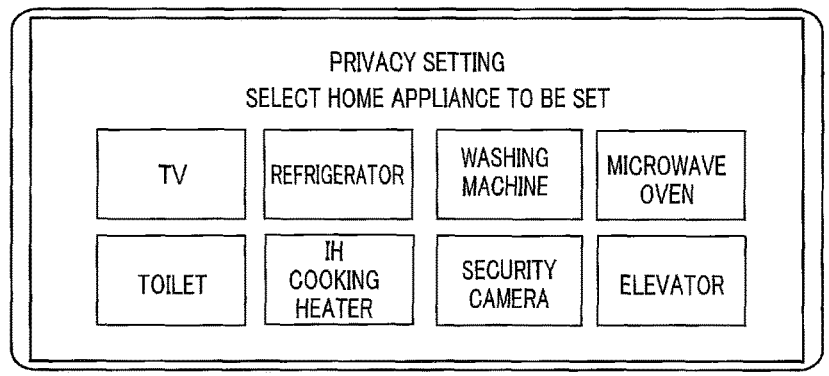
FIGS. 4A to 4C are diagrams illustrating examples of privacy setting screens.
Figure 4B:
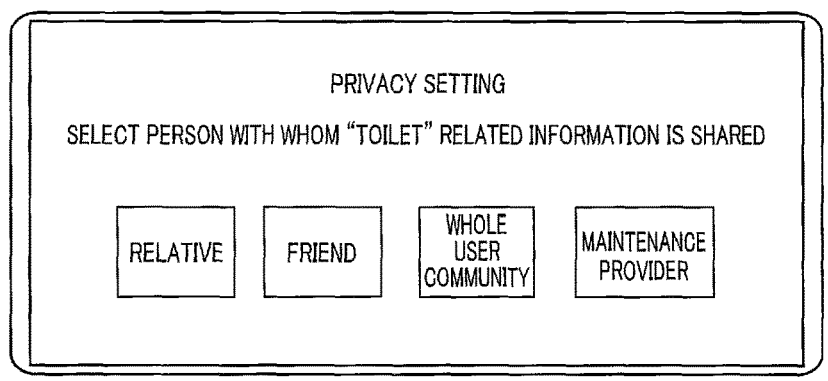
Figure 4C:
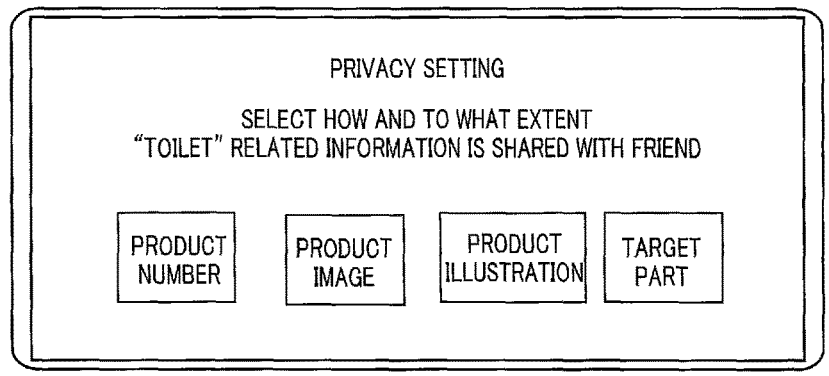

FIGS. 4A to 4C are diagrams illustrating examples of privacy setting screens. FIG. 4A shows selection buttons for devices in which a privacy setting is made, and a device in which a privacy setting is made is selected by pressing one selection button.

FIG. 4B shows a privacy setting screen when a "toilet" is selected, for example. FIG. 4B shows selection buttons to select a person who shares "toilet"-related information and a person who shares the "toilet"-related information is set by pressing each of these selection buttons.

Here, let us suppose that a "friend" is selected, for example. A privacy setting screen in this case is shown in FIG. 4C. FIG. 4C shows selection buttons to select contents to be shared with the "friend" and a range of information to be shared with the "friend" is set by pressing each of these selection buttons.

FIGS. 5A to 5E are diagrams illustrating examples of maintenance information indicated as a result of the privacy setting described in FIGS. 4A to 4C. FIGS. 5A to 5E show examples of cases where "toilet" is selected in FIG. 4A, "relative" is selected in FIG. 4B, "product illustration" and "target part" are selected in FIG. 4C, and also "toilet" is selected in FIG. 4A, "maintenance provider" is selected in FIG. 4B and "product number" and "target part" are selected in FIG. 4C.

Figure 5A:
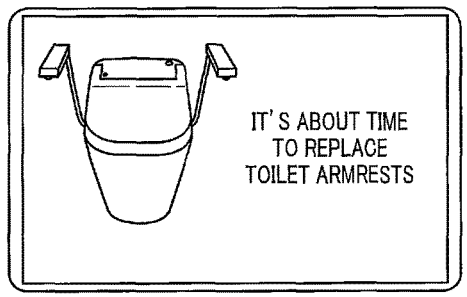
FIGS. 5A to 5E are diagrams illustrating examples of maintenance information indicated as a result of a privacy setting.
Figure 5B:
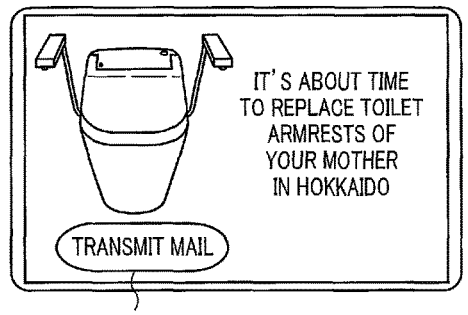
Figure 5C:
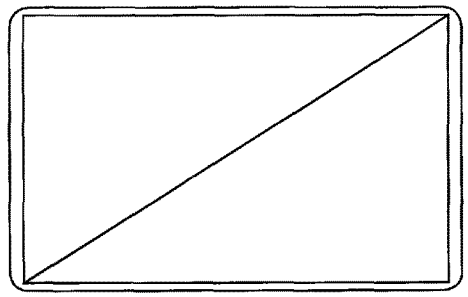
Figure 5D:
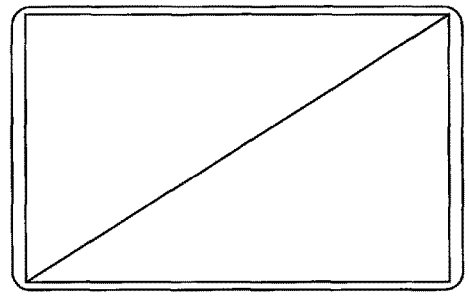
Figure 5E:
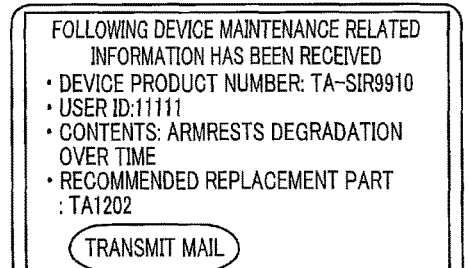

FIG. 5A illustrates maintenance information displayed so as to be indicated to the user of device 100. FIG. 5B illustrates maintenance information displayed so as to be indicated to a relative (child) of the user of device 100. FIG. 5C illustrates that the maintenance information is not indicated to the friend of the user of device 100. FIG. 5D illustrates that the maintenance information is not indicated to the members of the user community having the same model as device 100. FIG. 5E illustrates maintenance information displayed so as to be indicated to the maintenance provider of device 100. Mail transmission button 703 or 704 similar to mail transmission button 700, 701 or 702 shown in FIG. 3 is also shown in the maintenance information shown in FIG. 5B or FIG. 5E.

The reason that the maintenance information is not indicated to the friend of the user of device 100 or the members of the user community having the same model as device 100 is that "friend" and "whole user community" are not set as people with whom information is shared in the privacy setting screen in FIG. 4B.

The reason that the product illustration and target part "toilet armrests" are shown in FIG. 5B is that the "product illustration" and "target part" are selected in the privacy setting screen in FIG. 4C.

Thus, it is possible to protect the user's privacy by restricting the destination of transmission of maintenance information for each product or each content of maintenance information using a combination of a terminal apparatus that displays a screen for setting a range of transmission destinations in which transmission of maintenance information is allowed for each product or for each content of maintenance information and transmits transmission destination restriction information indicating the range of transmission destinations set by the user to a server apparatus, and the server apparatus that determines the transmission destination to which the maintenance information is transmitted from among transmission destinations for which transmission of the maintenance information is allowed based on the transmission destination restriction information received from the terminal apparatus and transmits the maintenance information. It is also possible to avoid maintenance information from being transmitted to users who do not desire transmission of maintenance information.

Figure 6A:
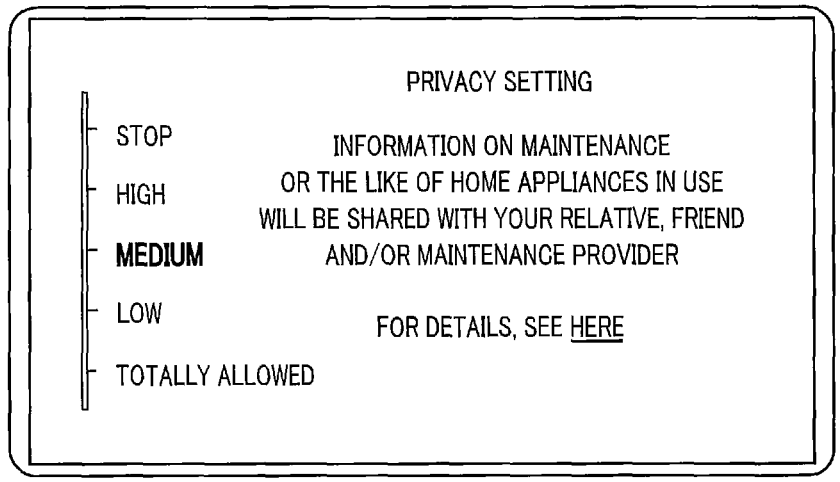
FIGS. 6A and 6B are diagrams illustrating examples of privacy setting screens when a privacy setting is made in all devices collectively.
Figure 6B:
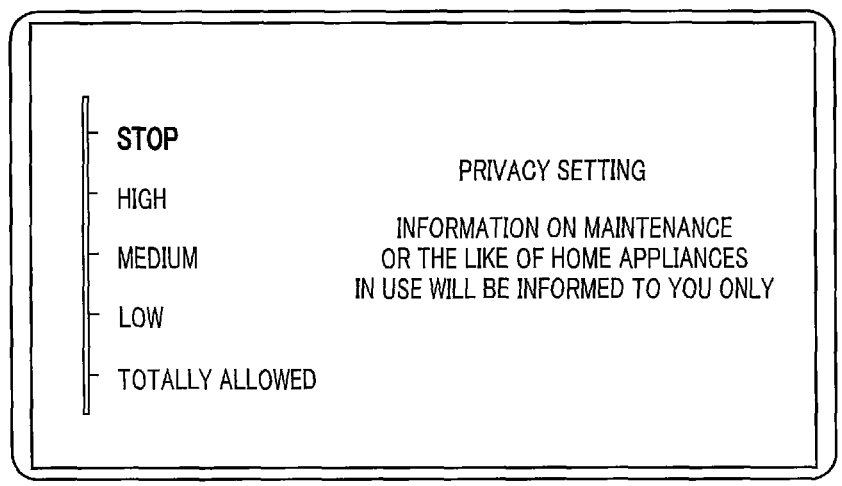

Here, although it is assumed that a privacy setting is made for each device as shown in FIG. 4A, a privacy setting may be made for all devices collectively. FIGS. 6A and 6B illustrate examples of privacy setting screens when a privacy setting is made for all devices, collectively.

FIG. 6A shows a plurality of security levels provided on a step-by-step basis such as "Stop," "High," "Medium," "Low" and "Totally allowed". The "Stop" level corresponds to indicating maintenance information to only the user of device 100. The "high" level corresponds to indicating maintenance information to only the user of device 100 and the relative shown in FIG. 4B.

The "Medium" level corresponds to indicating maintenance information to only the user of device 100, "relative" and "friend" shown in FIG. 4B. The "Low" level corresponds to indicating maintenance information to the user of device 100, "relative", "friend" and "maintenance provider" shown in FIG. 4B. The "Totally allowed" level corresponds to indicating maintenance information to the user of device 100, "relative," "friend," "whole user community" and "maintenance provider" shown in FIG. 4B.

FIG. 6B illustrates an example of the privacy setting screen when "Stop" is selected in the screen in FIG. 6A. In this case, maintenance information is indicated to only the user of device 100, and so a message indicating this information to the user of device 100 is displayed. Using such a screen makes the privacy setting easier.

Here, the privacy setting is made using communication apparatus 300 and communication apparatus 400, but the privacy setting may also be made using device 100 and device 200.

Returning to the description in FIG. 2, server apparatus 500 is provided with information transmitting/receiving section 501, storage section 502, remaining life determining section 503, transmission destination determining section 504 and information generating section 505.

Information transmitting/receiving section 501 is an interface section that receives information transmitted from another apparatus and transmits information to another apparatus.

For example, information transmitting/receiving section 501 receives operation information transmitted from device 100 or device 200. Information transmitting/receiving section 501 also receives information set using the privacy setting screens in FIG. 4 and FIG. 6 from communication apparatus 300 or communication terminal 400. Information transmitting/receiving section 501 also transmits maintenance information of each device to device 100 or device 200.

Storage section 502 is a storage device such as a memory or hard disk apparatus. This storage section 502 stores information such as operation information transmitted from another apparatus, maintenance information to be transmitted to another apparatus, relationship information indicating a relationship between a user of each device and people other than the user, and remaining life management information that registers information on the remaining life of a part of each device.

FIG. 7 is a diagram illustrating an example of relationship information stored in storage section 502. This related information includes information such as a user ID, name, address, mail address, destination, concerned user ID and relationship. The user ID, name, address and mail address are user ID, name, address and mail address of a user of each device such as device 100 or device 200.

The destination is information on the communication destination assigned to each device such as device 100 or device 200. This destination is used when server apparatus 500 transmits maintenance information to each device such as device 100 or device 200.

The concerned user ID is information on the user ID of a user who has a predetermined relationship with a user of each device such as device 100 or device 200. The relationship is information indicating a relationship between a user of each device such as device 100 or device 200 and a user whose user ID is registered as a concerned user ID.

For example, in FIG. 7, concerned user ID "11423" is registered in association with user ID "11111" and further information of "relative (father-child)" is registered as a relationship of the information. This shows a relationship that the user with user ID "11111" is a father and the user with concerned user ID "11423" is a relative (child).

In FIG. 7, "11111" is registered as a concerned user ID of user ID "11423" and information of "relative (child-father)" is registered as a relationship of the user IDs. This indicates a relationship that the user with user ID "11423" is a child and the user with concerned user ID "11111" is a relative (parent). This relationship is consistent with the aforementioned relationship. The same applies to the relationship "relative (mother-child)" between the users with user ID "11112" and concerned user ID "41589."

Moreover, "51534" is registered as a concerned user ID of user ID "11111" and information "friend" is registered as a relationship of the user IDs. This indicates a relationship that the user with user ID "11111" and the user with concerned user ID "51534" are friends.

Furthermore, "32325" is registered as a concerned user ID of user ID "11111" and information "customer-maintenance provider" is registered as a relationship of the user IDs. This indicates a relationship that the user with user ID "11111" is a customer of a maintenance provider with concerned user ID "32325."

Furthermore, "12451" is registered as a concerned user ID of user ID "11111" and information "community member" is registered as a relationship of the user IDs. This indicates a relationship that the user with user ID "11111" and the user with concerned user ID "12451" are members of a user community of a device such as device 100 or device 200.

Note that information on a relationship such as friends need not only be fixedly set beforehand, but may also be dynamically changed as follows. For example, information transmitting/receiving section 501 acquires information such as names, addresses, mail addresses of users registered as friends from the server apparatus that provides SNS (Social Networking Service).

Information transmitting/receiving section 501 identifies a user ID registered in the relationship information shown in FIG. 7 from the information, registers user IDs of other users as concerned user IDs in association with the user ID of the one identified user and further registers information "friend" as a relationship between those users. It is thereby possible to set people currently in a friend relationship as friends appropriately and without spending time and effort.

Moreover, all people registered with SNS as friends need not be registered as friends in the relationship information shown in FIG. 7, and information transmitting/receiving section 501 may register only users who have exchanged messages a predetermined number of times or more within a certain period of time in SNS. The information on the number of times messages have been exchanged within a certain period of time may be acquired from the server apparatus that provides SNS, for example.

Returning to the description in FIG. 2, storage section 502 further stores remaining life management information. The remaining life management information is information generated based on operation information transmitted from each device such as device 100 or device 200.

FIG. 8 is a diagram illustrating an example of the remaining life management information stored in storage section 502. This remaining life management information includes information on a user ID, device ID, remaining life information and privacy setting information. The user ID is information on a user ID of a user of each device such as device 100 or device 200. The device ID is information on an ID of each device such as device 100 or device 200.

The remaining life information is information relating to a remaining life of each device such as device 100 or device 200. The remaining life information includes information on a part ID, life, operation time, and remaining life. The part ID is information on an ID of each part making up a device such as device 100 or device 200. The life is information on a life of each part. The life is set beforehand.

The operation time is information on an operation time of each part (operation time after replacement in the case of a replaced part). This information on the operation time is included in operation information received from each device such as device 100 or device 200. The remaining life is information on a remaining life of each part. This remaining life is calculated by subtracting the operation time from the life.

The privacy setting information is setting information on a sharer of maintenance information and shared contents. The privacy setting information includes information on the sharer and shared contents. The sharer is information on the sharer who shares maintenance information of each device. For example, "relative," "friend," "community member" and "maintenance provider" are registered as the information on the sharer. This is the sharer set in the privacy setting screen described in FIG. 4B or FIG. 6A.

The shared contents are information on contents of maintenance information of each device shared among the above sharers. For example, "product number," "product image," "product illustration," and "target part" are registered for each sharer such as a relative, friend or community member as information on the shared contents. These are the shared contents set in the privacy setting screen described in FIG. 4C.

For example, in FIG. 8, shared contents "product image & target part (relative)" are registered in association with user ID "11111," and this indicates that information on the product image and the target part is shared between the user with user ID "11111" and the user's relative. The reason that information on the shared contents is not registered for the maintenance provider is that all information is shared with the maintenance provider.

Returning to the description in FIG. 2, remaining life determining section 503 is a processing section that reads information on the life of each part and information on the operation time from the remaining life management information shown in FIG. 8 and determines the remaining life of each part based on the information. More specifically, remaining life determining section 503 calculates the remaining life by subtracting the operation time from the life and registers the calculated remaining life in the remaining life management information.

Transmission destination determining section 504 is a processing section that determines a transmission destination of the maintenance information using the relationship information shown in FIG. 7 and the remaining life management information shown in FIG. 8.

More specifically, transmission destination determining section 504 reads information on a remaining life of each part from the remaining life management information shown in FIG. 8. Next, when a remaining life of one part reaches a predetermined remaining life (including a case where the remaining life is 0 hours) or becomes shorter than a predetermined remaining life (e.g., 100 hours), transmission destination determining section 504 determines a device provided with the part as the transmission destination of the maintenance information.

Transmission destination determining section 504 reads information on a sharer stored in association with the part ID of the part from the remaining life management information shown in FIG. 8. Transmission destination determining section 504 searches for concerned user IDs for which relationships that match the information of the sharer are registered from among concerned people IDs registered in association with the user ID of the user of the device provided with the part in the relationship information shown in FIG. 7. Transmission destination determining section 504 then determines the destination registered in association with the concerned user ID as the transmission destination of the maintenance information.

For example, in FIG. 8, part ID "CP9840" and sharer "relative" are registered in association with user ID "11111." In this case, in addition to the user with user ID "11111," transmission destination determining section 504 determines destination "CCCCCC" of concerned user ID "11423" whose relationship is registered as "relative" in the relationship information in FIG. 7 as the transmission destination of the maintenance information.

Similarly, in FIG. 8, part ID "CP9840" and sharer "friend" are registered in association with user ID "11111." In this case, in addition to the user with user ID "11111," transmission destination determining section 504 determines the destination of concerned user ID "51534" whose relationship is registered as "friend" in the relationship information in FIG. 7 as the transmission destination of the maintenance information.

Moreover, in FIG. 8, part ID "CP9840" and sharer "community member" are registered in association with user ID "11111." In this case, in addition to the user with user ID "11111," transmission destination determining section 504 determines the destination of concerned user ID "12451" whose relationship is registered as "community member" in the relationship information in FIG. 7 as the transmission destination of the maintenance information.

In FIG. 8, part ID "CP9840" and sharer "maintenance provider" are registered in association with user ID "11111."

In this case, in addition to the user with user ID "11111," transmission destination determining section 504 determines the destination of concerned user ID "32325" whose relationship is registered as "customer-maintenance provider" in the relationship information in FIG. 7 as the transmission destination of the maintenance information.

Note that transmission destination determining section 504 may determine a device of a user who is located closest to the user of device 100 among devices of a plurality of users that can be possible transmission destinations as the transmission destination of the maintenance information.

For example, when there are a plurality of users whose privacy setting information is "relative" and whose relationship is registered as "relative" in the relationship information, transmission destination determining section 504 determines a user whose address is closest to the address of the user of the device 100 based on the address of the user of device 100 and the addresses of the respective users. Transmission destination determining section 504 determines the destination of the device of the user registered in the relationship information shown in FIG. 7 as the transmission destination.

For example, in this case, storage section 502 stores information on the correspondence between addresses and latitudes/longitudes. Transmission destination determining section 504 reads information on latitudes/longitudes corresponding to the two addresses from storage section 502, calculates a distance, and thereby determines a user whose address is closest to the address of the user of device 100.

It is thereby possible to transmit maintenance information to a person whose address is physically close to the house of the user of device 100 and effectively motivate the user of device 100 to take action associated with maintenance by the person's actual visit to the house of the user of device 100, for example.

Information generating section 505 is a processing section that generates maintenance information to be transmitted to a transmission destination determined by transmission destination determining section 504. For example, as shown in FIG. 3A and FIG. 5A, information generating section 505 generates maintenance information for recommending the user of device 100 to replace a part whose remaining life reaches a predetermined remaining life or becomes shorter than a predetermined remaining life.

When there are transmission destinations other than device 100 determined by transmission destination determining section 504, information generating section 505 generates maintenance information using contents registered in the information on the shared contents shown in FIG. 8.

For example, when "product image & target part" is registered in association with "relative" in the information on the shared contents, information generating section 505 generates maintenance information including a product image, information on the target part of "compressor of refrigerator" and mail transmission button 700 as shown in FIG. 3B.

When "product illustration & target part" is registered in association with "friend" in the information on the shared contents, information generating section 505 generates maintenance information including product illustration, information on the target part of "compressor of refrigerator" and mail transmission button 701 as shown in FIG. 3C.

Furthermore, when "product number & target part" is registered in association with "community member" in the information on the shared contents, information generating section 505 generates maintenance information including information on "product number" describing "the same model as yours" and information on the target part "compressor of refrigerator" as shown in FIG. 3D.

When the transmission destination is the maintenance provider, information generating section 505 generates maintenance information including predetermined information required by the maintenance provider for maintenance and mail transmission button 702 as shown in FIG. 3E.

The maintenance information generated by information generating section 505 is transmitted to each device determined by transmission destination determining section 504 via information transmitting/receiving section 501. The maintenance information is displayed by each transmission destination device.

Figure 9:
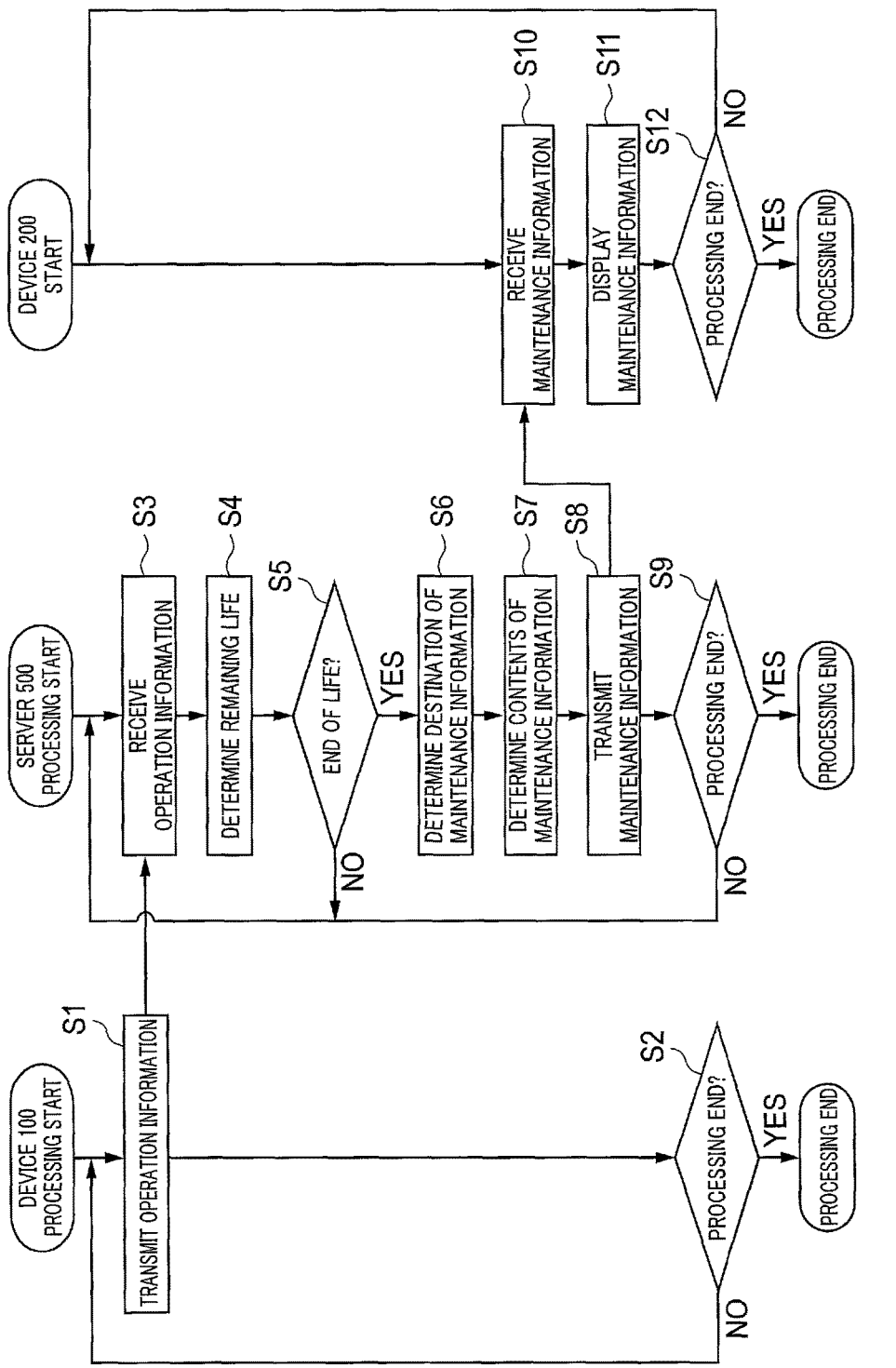
FIG. 9 is a flowchart illustrating an example of a processing procedure of maintenance information transmission processing according to the present embodiment.

Next, an example of the processing procedure of the maintenance information transmission processing according to the present embodiment will be described. FIG. 9 is a flowchart illustrating an example of the processing procedure of the maintenance information transmission processing according to the present embodiment. In the example in FIG. 9, let us suppose that the privacy setting described using FIGS. 4A to 4C and FIGS. 6A and 6B has been made beforehand.

First, information transmitting/receiving section 104 of device 100 transmits operation information to server apparatus 500 (step S1). The operation information includes information on an operation time (operation time after replacement in the case of a replaced part) of each part as described above.

After that, information transmitting/receiving section 104 determines whether or not an instruction for ending the maintenance information transmission processing is issued (step S2). The instruction for ending the maintenance information transmission processing is issued when power to device 100 is turned off, for example.

When an instruction for ending the maintenance information transmission processing is issued (YES in step S2), the processing performed by device 100 ends. When there is no instruction for ending the maintenance information transmission processing (NO in step S2), information transmitting/receiving section 104 resumes transmission of operation information after a lapse of a predetermined time (step S1).

Information transmitting/receiving section 501 of server apparatus 500 receives the operation information transmitted by device 100 (step S3). Information on the operation time of each part included in the operation information is registered as information on the operation time in the remaining life management information shown in FIG. 8. Other information is also stored in storage section 502.

Remaining life determining section 503 subtracts the operation time from the life predetermined for each part, thereby determines the remaining life and registers the determination result in the remaining life management information (step S4).

After that, transmission destination determining section 504 determines whether or not any one of the parts reaches an end of its life (step S5). Whether or not the life comes to an end is determined by whether or not the remaining life reaches a predetermined remaining life or whether or not the remaining life becomes shorter than the predetermined remaining life. When the remaining life of no part reaches the predetermined remaining life (NO in step S5), processes from step S3 onward are executed again.

When the life of one part reaches an end (YES in step S5), transmission destination determining section 504 searches for a person concerned having a predetermined relationship with the user of device 100 including the part based on the information on the person concerned shown in FIG. 7 and the remaining life management information shown in FIG. 8 and determines device 200 owned by the person concerned as the transmission destination (step S6).

Information generating section 505 generates maintenance information to be transmitted to the transmission destination determined by transmission destination determining section 504 using the information registered as shared contents in the remaining life management information shown in FIG. 8 (step S7).

Next, information transmitting/receiving section 501 transmits the maintenance information generated in step S7 to the destination determined in step S6 (step S8).

After that, information transmitting/receiving section 501 determines whether or not an instruction for ending the maintenance information transmission processing is issued (step S9). The instruction for ending the maintenance information transmission processing is issued when power to server apparatus 500 is turned off, for example.

When an instruction for ending maintenance information transmission processing is issued (YES in step S9), the processing performed by server apparatus 500 ends. When an instruction for ending the maintenance information transmission processing is not issued (NO in step S9), information transmitting/receiving section 501 resumes the process of receiving operation information (step S3).

Information transmitting/receiving section 204 of device 200 receives the maintenance information transmitted from server apparatus 500 (step S10). Indication section 202 displays the maintenance information as shown in FIG. 3B to FIG. 3E, FIG. 5B and FIG. 5E (step S11). It is thereby possible to indicate maintenance information to the person concerned who has a predetermined relationship with the user of device 100.

After that, information transmitting/receiving section 204 determines whether or not an instruction for ending the maintenance information transmission processing is issued (step S12). The instruction for ending maintenance information transmission processing is issued when power to device 200 is turned off, for example.

When an instruction for ending maintenance information transmission processing is issued (YES in step S12), the processing performed by device 200 ends. When no instruction for ending maintenance information transmission processing is issued (NO in step S12), information transmitting/receiving section 204 resumes the process of receiving maintenance information (step S10).

An embodiment of the present invention has been described so far, but the embodiment of the present invention is not limited to this. For example, in the above embodiment, the maintenance information associated with maintenance of device 100 is indicated to a person concerned having a predetermined relationship with the user of device 100, but the maintenance information associated with maintenance of device 200 of the person concerned may also be indicated with the maintenance information mentioned earlier.

Figure 10:
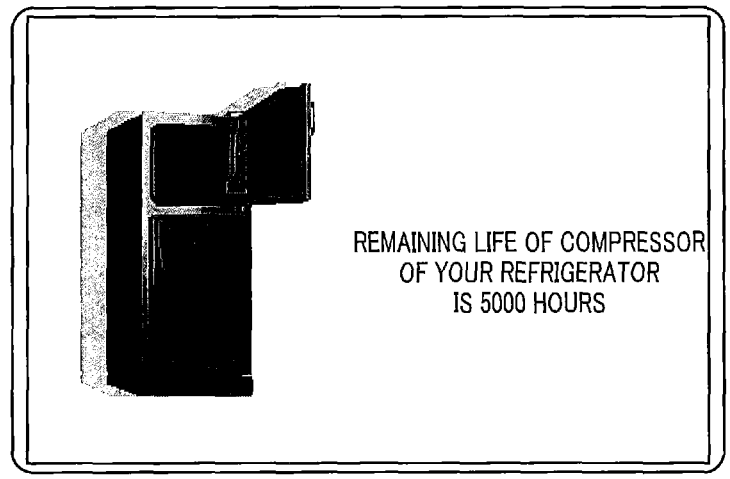
FIG. 10 is a diagram illustrating an example of maintenance information of a device of a person concerned.

FIG. 10 is a diagram illustrating an example of maintenance information associated with maintenance of device 200 of a person concerned. For example, let us suppose that a case where device 100 and device 200 are refrigerators, the life of the compressor of device 100 comes to an end and maintenance information is indicated to the user of device 100 and a person concerned thereof (owner of device 200).

In this case, information generating section 505 of server apparatus 500 generates the maintenance information as shown in FIG. 3B, reads information on the remaining life of the compressor of device 200 from the remaining life management information shown in FIG. 8 and generates maintenance information as shown in FIG. 10.

Information transmitting/receiving section 501 adds the maintenance information to maintenance information associated with maintenance of device 100 and transmits these maintenance information items to device 200. The maintenance information items are displayed on device 200 and indicated to the owner of device 200.

Upon receiving a notice that the life of the compressor of device 100 is coming to an end, there may be a user of device 200 who is concerned about the remaining life of the compressor of own device 200.

In such a case, taking a case where the life of device 100 comes to an end as a trigger and indicating the maintenance information as shown in FIG. 10 makes it possible to easily indicate the situation of the compressor of device 200 to the user of device 200.

Figure 11:
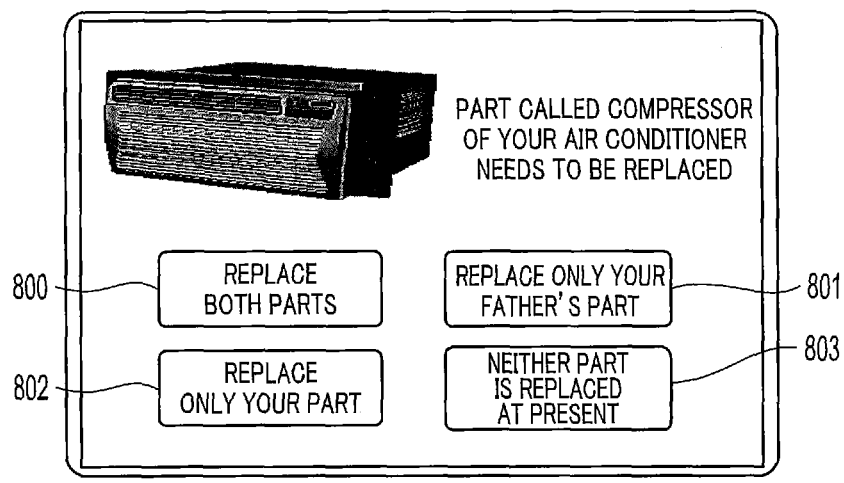
FIG. 11 is a diagram illustrating an example of a maintenance requesting screen on which a request can be made to a maintenance provider to perform maintenance.

Not only maintenance information is displayed but also a request may be made to the maintenance provider to perform maintenance from the screen in which the maintenance information is displayed. FIG. 11 is a diagram illustrating an example of the maintenance screen on which it is possible to request the maintenance provider to perform maintenance.

FIG. 11 illustrates an example of a case where not only the life of the part of device 100 is coming to an end but also the life of the part of device 200 owned by a person concerned of the user of device 100 is coming to an end. In this case, maintenance information associated with maintenance of device 100 is transmitted to device 200.

In addition, since the life of the part (compressor of air conditioner) of device 200 is also coming to an end, information generating section 505 of server apparatus 500 generates maintenance information as shown in FIG. 11.

This maintenance information includes button 800 for requesting the maintenance provider to perform maintenance on both the part of device 100 and the part of device 200, button 801 for requesting the maintenance provider to perform maintenance on only the part of device 100, button 802 for requesting the maintenance provider to perform maintenance on only the part of device 200 and button 803 for selecting not to request maintenance at the present moment.

When the user of device 200 presses button 800, the mail transmission function of device 200 is activated, the mail address of the maintenance provider is set as the destination, and information processing section 205 generates an electronic mail including information associated with maintenance of device 100 and device 200.

When the user of device 200 presses button 801, the mail transmission function of device 200 is activated. Information processing section 205 sets the mail address of the maintenance provider as the destination and generates an electronic mail including information associated with maintenance of device 100.

On the other hand, when the user of device 200 presses button 802, the mail transmission function of device 200 is activated, the mail address of the maintenance provider is set as the destination and information processing section 205 generates an electronic mail including information associated with maintenance of device 200.

Here, server apparatus 500 includes information on the mail address of the maintenance provider and information associated with maintenance of device 100 and device 200 in the maintenance information. Information processing section 205 generates an electronic mail using this information. The electronic mail generated by information processing section 205 is transmitted by information transmitting/receiving section 204. This allows the user of device 200 to easily request maintenance from the screen of maintenance information.

When the user of device 200 presses button 803, the mail transmission function of device 200 is not activated, and the screen representation in FIG. 11 ends.

Information on the life, operation time and remaining life of a part making up each device is registered in the remaining life management information shown in FIG. 8, but information on the life, operation time and remaining life of each device may also be registered.

When the remaining life of a certain device reaches a predetermined remaining life or becomes shorter than a predetermined remaining life, it may also be possible to search for a person concerned having a predetermined relationship with the user of the device and transmit maintenance information associated with maintenance of the device whose remaining life reaches a predetermined remaining life or becomes shorter than a predetermined remaining life to the device owned by the person concerned through processing similar to the processing according to the above embodiment.

In the above embodiment, maintenance information is transmitted to device 100 and device 200, but maintenance information may be transmitted to communication terminal 300 and communication terminal 400 and maintenance information may be indicated to the user of device 100 and the user of device 200. The maintenance information may also be transmitted by electronic mail.

In the above embodiment, the button may be a physically independent button or an icon or the like displayed on a touch panel.

Embodiment 2

Figure 12:
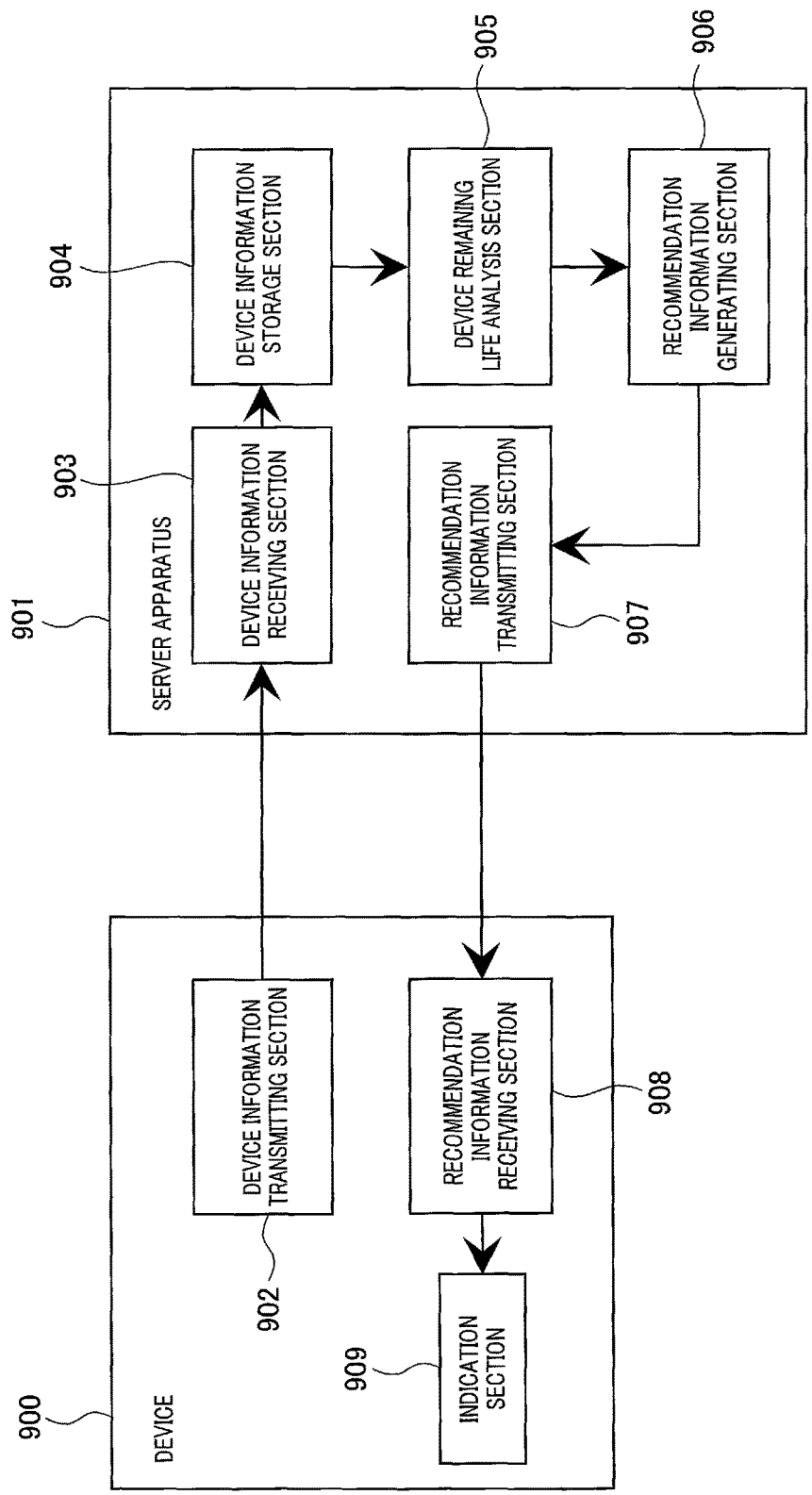
FIG. 12 is a block diagram illustrating another configuration of the device life indication system.

FIG. 12 is a block diagram illustrating another configuration of the device life indication system. The device life indication system is constructed of device 900 and server apparatus 901.

Device 900 is constructed of device information transmitting section 902 that transmits operation state change information of device 900 as device information, recommendation information receiving section 908 that receives recommendation information from server apparatus 901 and indication section 909 that indicates the recommendation information.

On the other hand, server apparatus 901 is constructed of device information receiving section 903 that receives device information transmitted from device 900, device information storage section 904 that stores the received device information, device remaining life analysis section 905 that analyzes a remaining life of device 900 or a part making up device 900 based on the device information stored in device information storage section 904, recommendation information generating section 906 that generates recommendation information for recommending replacement with a device different from device 900 or replacement of a part making up device 900 or maintenance of device 900 based on the analyzed remaining life, and recommendation information transmitting section 907 that transmits the recommendation information generated by recommendation information generating section 906.

The overall operation of the device life indication system configured as described above will be described.

Device information transmitting section 902 in device 900 transmits data such as operation time, manipulation history, operation history, maintenance history and device ID of device 900 as device information to device information receiving section 903 in server apparatus 901. Device information receiving section 903 receives the device information and outputs the received device information to device information storage section 904. Device information storage section 904 stores the inputted device information. Device remaining life analysis section 905 analyzes the remaining life of device 900 or a part making up device 900 based on the device information stored in device information storage section 904.

Here, the remaining life analysis method in device remaining life analysis section 905 will be described.

Device remaining life analysis section 905 stores life data of a device (e.g., operation life time) as life determining data to determine the life of device 900. Device remaining life analysis section 905 compares operation data of device 900 (e.g., total operation time after device 900 executed the last maintenance until the current time) with life data out of the device information stored in storage section 904 and calculates a remaining life of device 900 until the life of device 900 comes to an end. Thus, device remaining life analysis section 905 can analyze and calculate the remaining life of device 900.

Device remaining life analysis section 905 stores life data of each part making up device 900 as life determining data for determining the life of device 900, compares the life data with operation data of device 900 in the same way as that described above, and thereby calculates the remaining life until the life of the part making up device 900 comes to an end. Thus, device remaining life analysis section 905 can analyze and calculate the remaining life of each part making up device 900.

Recommendation information generating section 906 generates recommendation information for recommending replacement with a device different from device 900 or replacement of a part making up device 900 or maintenance of device 900 based on the remaining life calculated in device remaining life analysis section 905 so as not to cause availability of the device to deteriorate.

Recommendation information transmitting section 907 transmits the recommendation information generated in recommendation information generating section 906 to recommendation information receiving section 908 in device 900. Recommendation information receiving section 908 receives the recommendation information and outputs the received recommendation information to indication section 909. Indication section 909 is, for example, a display and displays the inputted recommendation information and thereby indicates the recommendation information to the operator of device 900.

Here, a method of generating recommendation information and recommendation information in recommendation information generating section 906 and indication of the recommendation information in the device life indication system will be described.

Recommendation information generating section 906 stores a remaining life determining value (e.g., remaining life of one month) for determining whether the remaining life of device 900 is longer or shorter than a reference remaining life. Recommendation information generating section 906 compares the remaining life calculated in device remaining life analysis section 905 with the remaining life determining value. In this way, recommendation information generating section 906 determines whether the remaining life of device 900 is longer or shorter than the reference remaining life, that is, whether or not the remaining life of device 900 is shorter than one month.

Recommendation information generating section 906 stores an elapsed time determining value (e.g., 5 years) to determine whether an elapsed time after manufacturing of device 900 is longer or shorter than a reference time. Recommendation information generating section 906 acquires the date of manufacture of device 900 from device information (e.g., device ID) of device 900 stored in device information storage section 904, calculates the elapsed time after manufacture of device 900 and compares the elapsed time with the elapsed time determining value. In this way, recommendation information generating section 906 determines whether the elapsed time after manufacture of device 900 is longer or shorter than a reference time, that is, whether or not device 900 is an old device manufactured at least five years ago.

Recommendation information generating section 906 generates recommendation information based on the result of determination as to whether or not the remaining life of device 900 is short and the result of determination as to whether or not device 900 is an old device.

First, when it is determined that the remaining life of device 900 is short and that device 900 is an old device, recommendation information generating section 906 sets the necessity for replacement of device 900 and the result of extracting a device to be a replacement candidate as recommendation information.

Here, the following method may be used to extract a device which becomes a replacement candidate. That is, this is a method of extracting a device of the same type as device 900 that is available or replaceable within the remaining life of device 900 and having performance equivalent to that of device 900 based on information on the inventory of the device of the same kind as device 900 at shops that sell and replace devices and information on the manufacturing situation of the device of the same kind as device 900.

The necessity for replacement of device 900 and the result of extracting a device which becomes a replacement candidate, which is recommendation information, are indicated to the operator of device 900 via recommendation information transmitting section 907, recommendation information receiving section 908 and indication section 909.

As described above, the device life indication system indicates the necessity for replacement of device 900 and recommendation of a replacement candidate to the operator of device 900 based on the remaining life calculated in device remaining life analysis section 905.

Therefore, when the remaining life of device 900 is short and device 900 is an old device, the operator of device 900 can achieve appropriate device replacement prompted by an indication of recommendation before device 900 breaks down, and as a result, the operator of device 900 can continue to use the device without causing availability of the device to deteriorate.

When it is determined that the remaining life of device 900 is short and that device 900 is not an old device, recommendation information generating section 906 sets the necessity for maintenance of device 900 and the result of extracting a maintenance provider capable of performing maintenance as recommendation information.

The necessity for maintenance of device 900 and the result of extracting a maintenance provider capable of performing maintenance are indicated to the operator via recommendation information transmitting section 907, recommendation information receiving section 908 and indication section 909.

As described above, the device life indication system indicates the necessity for maintenance of device 900 and recommendation of a maintenance provider capable of performing maintenance to the operator of device 900 based on the remaining life calculated in device remaining life analysis section 905.

Therefore, when the remaining life of device 900 is short and device 900 is not an old device, the operator of device 900 can request the maintenance provider to perform appropriate maintenance prompted by an indication of recommendation before device 900 breaks down, and as a result, it is possible to extend the remaining life of device 900 without causing availability of the device to deteriorate and the operator can thereby continue to use the device.

On the other hand, when it is determined that the remaining life of device 900 is not short and that device 900 is an old device, recommendation information generating section 906 sets a daily maintenance method for device 900 as recommendation information.

The daily maintenance method for device 900 which is recommendation information is indicated to the operator of device 900 via recommendation information transmitting section 907, recommendation information receiving section 908 and indication section 909.

As described so far, the device life indication system indicates the recommendation of the daily maintenance method for device 900 to the operator of device 900 based on the remaining life calculated in device remaining life analysis section 905.

Therefore, when the remaining life of device 900 is not short and device 900 is an old device, the operator of device 900 can perform daily maintenance for device 900 prompted by an indication of recommendation, and as a result, it is possible to extend the remaining life of device 900 without causing availability of the device to deteriorate and the operator of device 900 can thereby continue to use the device.

Similarly, when it is determined that the remaining life of device 900 is not short and that device 900 is not an old device, recommendation information generating section 906 sets the daily maintenance method for device 900 as the recommendation information and the device life indication system indicates recommendation of the daily maintenance method for device 900 to the operator of device 900 based on the remaining life calculated in device remaining life analysis section 905.

Therefore, when the remaining life of device 900 is not short and device 900 is not an old device, the operator of device 900 can perform daily maintenance of device 900 prompted by an indication of recommendation, and as a result, the operator of device 900 can continue to use the device by extending the remaining life of device 900 without causing availability of the device to deteriorate.

Here, recommendation information generating section 906 uses the method of generating recommendation information based on the remaining life of the device calculated in device remaining life analysis section 905, but the following method may also be used.

That is, this is a method which generates recommendation information based on the remaining life of the part making up device 900 calculated in device remaining life analysis section 905. As described so far, recommendation information generating section 906 can generate recommendation information for recommending replacement of a part making up device 900 based on the remaining life of the part making up device 900 calculated in device remaining life analysis section 905.

As described above, the present embodiment stores device information of device 900, analyzes the remaining life of device 900 based on the stored device information and indicates recommendation for replacement of the part making up device 900 or maintenance of device 900 to the operator of device 900 based on the analyzed remaining life.

Therefore, this device life indication system allows the operator of device 900 to perform appropriate device replacement before device 900 breaks down or appropriate replacement of a part making up device 900 before device 900 breaks down or appropriate maintenance before device 900 breaks down or daily maintenance of device 900, and as a result, the operator of device 900 can continue to use device 900 without causing availability of the device to deteriorate.

Note that although the present embodiment adopts the method of using a determination as to whether or not the remaining life of device 900 is short and a determination as to whether or not device 900 is an old device as the method of generating recommendation information in recommendation information generating section 906, the present invention is not limited to that method. That is, similar effects can be obtained as long as the method generates recommendation information using the remaining life of device 900.

Note that the present embodiment assumes the remaining life determining value used to determine whether the remaining life of device 900 is short or not to be one month, but the remaining life determining value is not limited to that value.

The present embodiment assumes the elapsed time determining value used to determine whether or not device 900 is an old device to be five years, but the elapsed time determining value is not limited to that value.

Note that in the present embodiment, recommendation information generating section 906 uses a method of extracting a device based on information on the inventory of the device of the same kind as device 900 at shops that sell and replace devices and information on the manufacturing situation of the device of the same kind as device 900 to extract a device to be a replacement candidate for device 900 as recommendation information, but the present invention is not limited to that extraction method. That is, the following method may also be used.

For example, recommendation information generating section 906 adopts a method of realizing a daily operating condition of device 900 using manipulation history data or operation history data out of device information of device 900 stored in device information storage section 904 and extracting a device which becomes a replacement candidate according to the realized result. In this method, for example, when a certain function in device 900 is frequently used, a device in which the function can be effectively executed is extracted as a replacement candidate device.

As described above, recommendation information generating section 906 can extract an optimum device in correspondence with an operating condition of device 900 as a replacement candidate.

Therefore, the operator of device 900 can achieve appropriate device replacement prompted by an indication of recommendation before device 900 breaks down, and as a result, the operator of device 900 can thereby continue to use the extracted device in correspondence with an operating condition of device 900 without causing availability of the device to deteriorate.

In the present embodiment, when the remaining life of device 900 is not short, the recommendation information shows a daily maintenance method for device 900 so as to indicate recommendation of a daily maintenance method for device 900 to the operator of device 900. The following method may also be adopted. That is, similar effects may be achieved even when the recommendation information shows, for example, extraction or purchase of a maintenance device to be used for daily maintenance of device 900 or extraction or purchase of consumable items for device 900.

Figure 13:
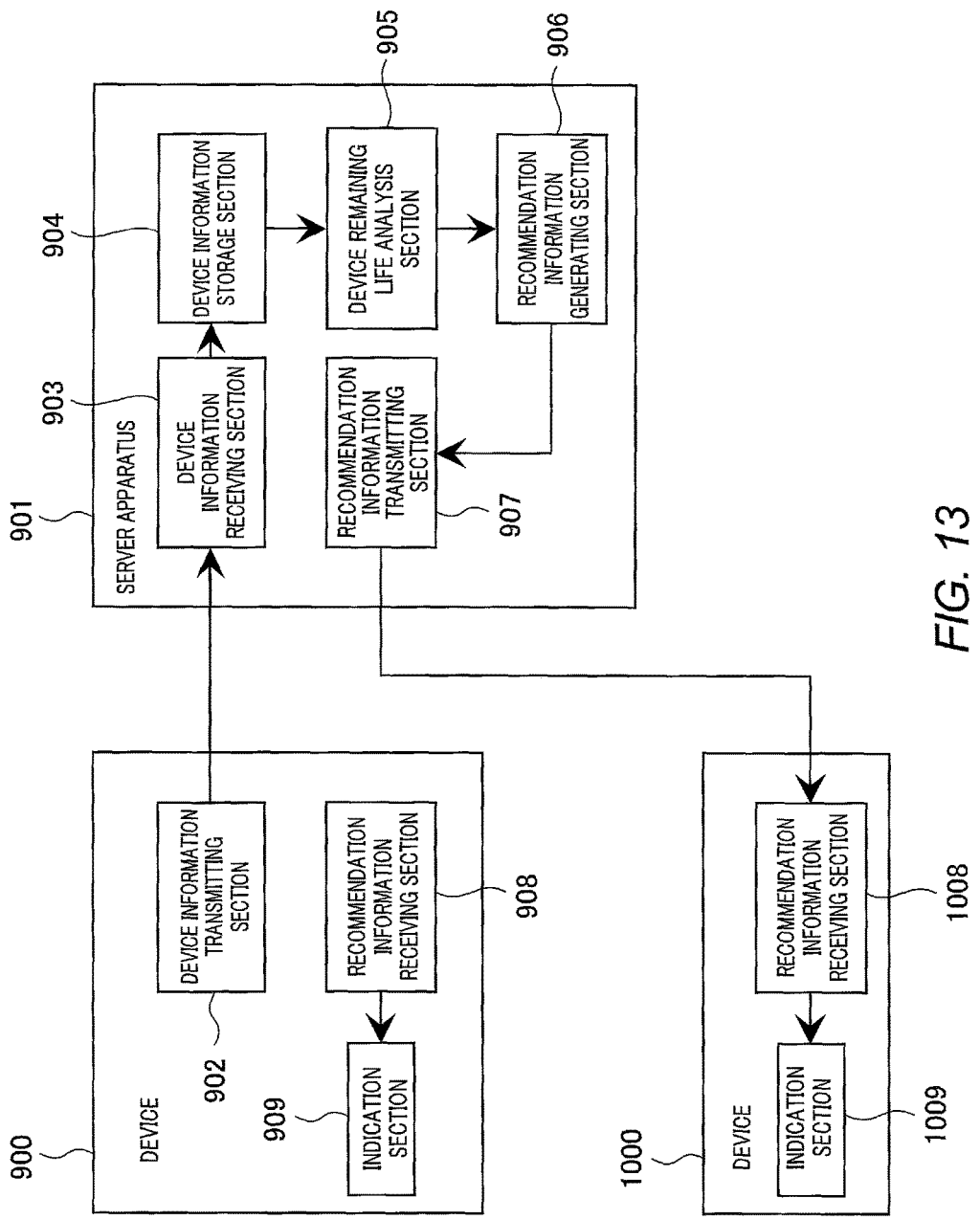
FIG. 13 is a block diagram illustrating a configuration of the device life indication system when recommendation information is transmitted to a different device.

Next, a case where the recommendation information is transmitted to a device different from device 900 will be described. FIG. 13 is a block diagram illustrating a configuration of a device life indication system when the recommendation information is transmitted to a device different from device 900.

The same components as those in FIG. 12 are assigned the same reference numerals and any description of the same components will be omitted.

Device 1000 is constructed of recommendation information receiving section 1008 that receives recommendation information from server apparatus 901 and indication section 1009 that indicates the recommendation information.

An overall operation of the device life indication system configured as described above will be described.

Recommendation information generating section 906 determines whether the remaining life of device 900 is longer or shorter than a reference remaining life, that is, whether or not the remaining life of device 900 is shorter than one month. Upon determining that the remaining life of device 900 is shorter, recommendation information generating section 906 generates the necessity for replacement of device 900, a result of extracting a device which becomes a replacement candidate and necessity for maintenance of device 900 as recommendation information. The recommendation information generated by recommendation information generating section 906 based on the remaining life of device 900 is indicated to the operator of device 1000 different from device 900 via recommendation information transmitting section 907, recommendation information receiving section 1008 and indication section 1009 (e.g., a display). Here, the operator of device 1000 is a maintenance provider who performs maintenance of device 900.

As described above, upon determining that the remaining life of device 900 is short, the recommendation information is immediately displayed on indication section 1009 of device 1000, and the maintenance provider who performs maintenance of device 900 can immediately realize the necessity for replacement and the necessity for maintenance of device 900.

Therefore, when the remaining life of device 900 is short, the maintenance provider of device 900 can achieve appropriate device replacement and perform maintenance prompted by an indication of recommendation information before device 900 breaks down, and as a result, the operator of device 900 can continue to use the device without causing availability of the device to deteriorate.

As the method of generating recommendation information in recommendation information generating section 906, the present embodiment adopts a method using a determination as to whether or not the remaining life of device 900 is short, but the present invention is not limited to this method. That is, similar effects can be obtained by any method as long as the method generates recommendation information using the remaining life of device 900.

In the present embodiment, the remaining life determining value used to determine whether or not the remaining life of device 900 is short is assumed to be one month, but the remaining life determining value is not limited to that value.

In the present embodiment, the operator of device 1000 is a maintenance provider who performs maintenance of device 900, but the operator of device 1000 may be a distributor who sells device 900. As described above, when the remaining life of device 900 is short, the distributor who sells device 900 can achieve appropriate device replacement prompted by an indication of recommendation information before device 900 breaks down, and as a result, the operator of device 900 can continue to use the device without causing availability of the device to deteriorate.

As the method of analyzing the remaining life in device remaining life analysis section 905, the present embodiment adopts the method of calculating the remaining life by comparing the life data of the device with the operation data of device 900, but the present invention is not limited to this method. That is, similar effects can be obtained using a method of extracting the remaining life whereby, for example, device information storage section 904 stores device information of not only device 900 but also a plurality of devices of the same kind and compares a pattern obtained from the stored device information of the plurality of devices with the device information of device 900.

In this way, the device life indication system according to the present embodiment stores device information of a device, analyzes a remaining life of the device based on the stored device information and indicates recommendation of replacement of the device or a part making up the device or maintenance of the device based on the analyzed remaining life, and the operator of the device can thereby achieve appropriate device replacement before the device breaks down or appropriate replacement of the part making up the device before the device breaks down or appropriate maintenance before the device breaks down or daily maintenance of the device, and the operator of the device can continue to use the device without causing availability of the device to deteriorate. Thus, the device life indication system according to the present embodiment is suitable for use in home appliances, and factory and commercial devices.

The embodiments according to the present invention have been described in detail with reference to the accompanying drawings so far, and the functions of the apparatuses of above-described device 100 or device 200, communication apparatus 300, communication apparatus 400, server apparatus 500, device 900, server apparatus 901 and device 1000 can be implemented by a computer program.

Figure 14:
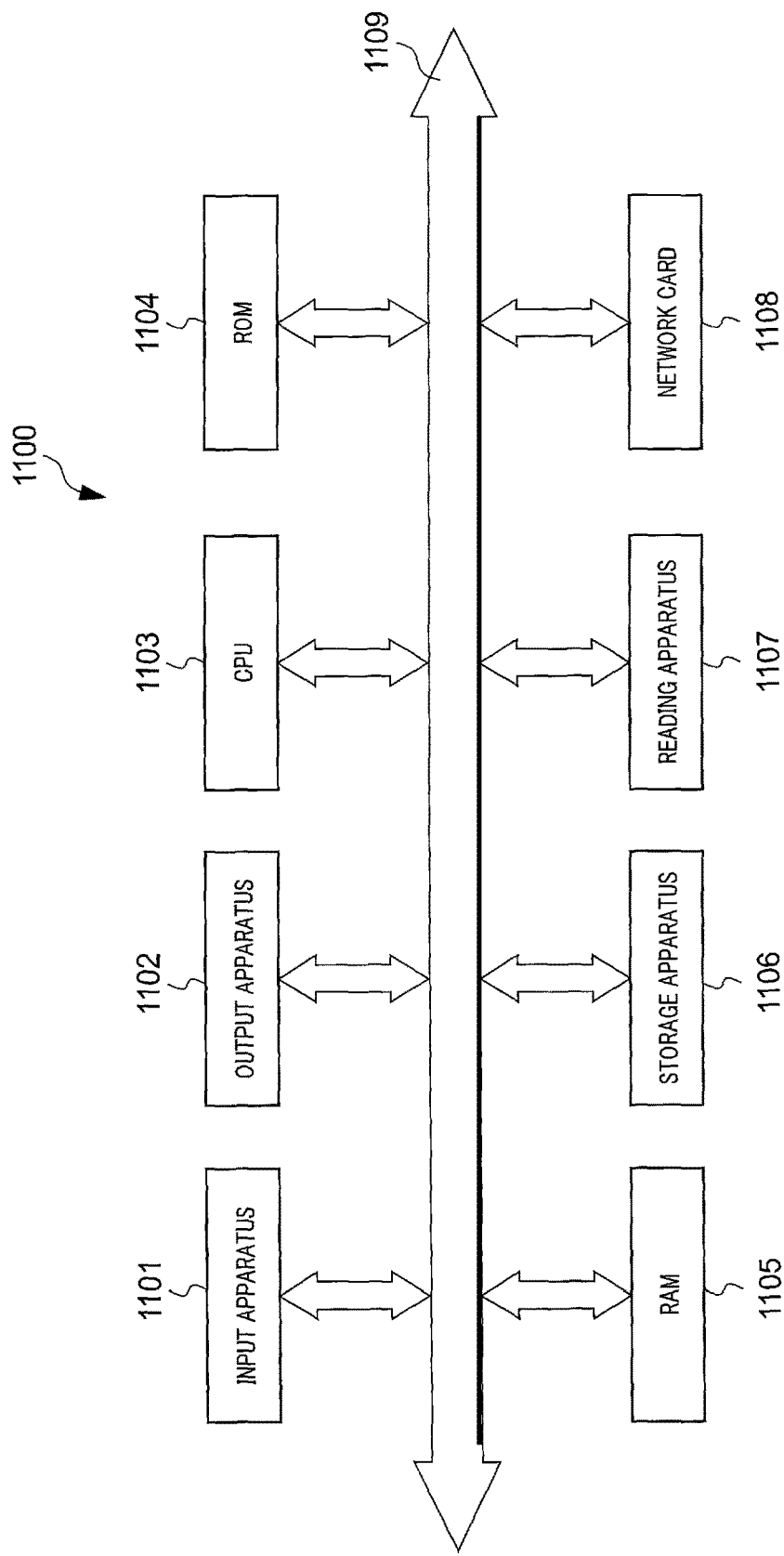
FIG. 14 is a diagram illustrating a hardware configuration of a computer that implements the functions of each apparatus by software.

FIG. 14 is a diagram illustrating a hardware configuration of a computer that implements the functions of the apparatuses by a program. This computer 1100 is provided with input apparatus 1101 such as a keyboard, mouse, or touch pad, output apparatus 1102 such as a display or speaker, CPU (Central Processing Unit) 1103, ROM (Read Only Memory) 1104, RAM (Random Access Memory) 1105, storage apparatus 1106 such as a hard disk apparatus or SSD (Solid State Drive), reading apparatus 1107 that reads information from a recording medium such as DVD-ROM (Digital Versatile Disk Read Only Memory) or USB (Universal Serial Bus) memory, and network card 1108 that performs communication via a network, and the sections are connected together by bus 1109.

Reading apparatus 1107 reads a program for implementing the function of each apparatus from the recording medium that records the program and causes storage apparatus 1106 to store the program. Alternatively, network card 1108 communicates with a server apparatus connected to a network and causes storage apparatus 1106 to store a program for implementing the functions of each apparatus downloaded from the server apparatus.

CPU 1103 makes a copy of the program stored in storage apparatus 1106 into RAM 1105, sequentially reads instructions included in the program from RAM 1105 and executes the instructions to thereby implement the functions of each apparatus.

The technique described in the above-described embodiments can be implemented, for example, in the following genres of cloud services. However, the genres in which the technique described in the above-described embodiments is implemented are not limited to these genres.

(Service Genre 1: Company's Own Data Center Type)

Figure 15:
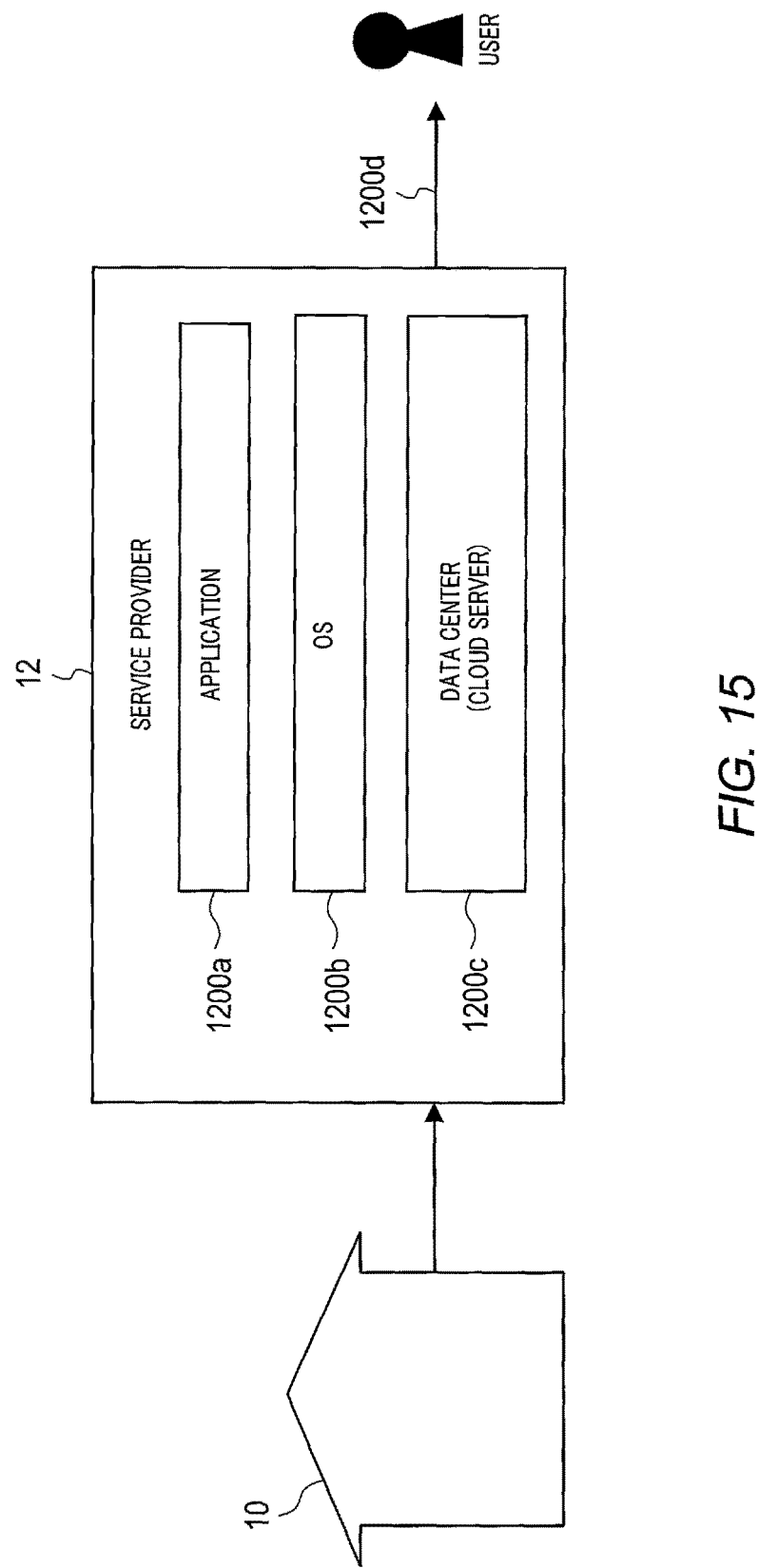
FIG. 15 is a diagram illustrating service genre 1 (company's own data center type)

FIG. 15 is a diagram illustrating service genre 1 (company's own data center type). This genre is a genre in which service provider 12 acquires information from group 10 and provides a service to a user. In this genre, service provider 12 has the function of a data center operating company. That is, the service provider owns cloud server 11*a* that manages big data. Therefore, there is no data center operating company.

In this genre, service provider 12 operates and manages a data center (cloud server 11*a*) (1200*c*). Service provider 12 also manages an OS (1200*b*) and an application (1200*a*). Service provider 12 provides a service (1200*d*) using the OS (1200*b*) and the application (1200*a*) under the management of service provider 12.

(Service Genre 2: Type Using IaaS)

Figure 16:
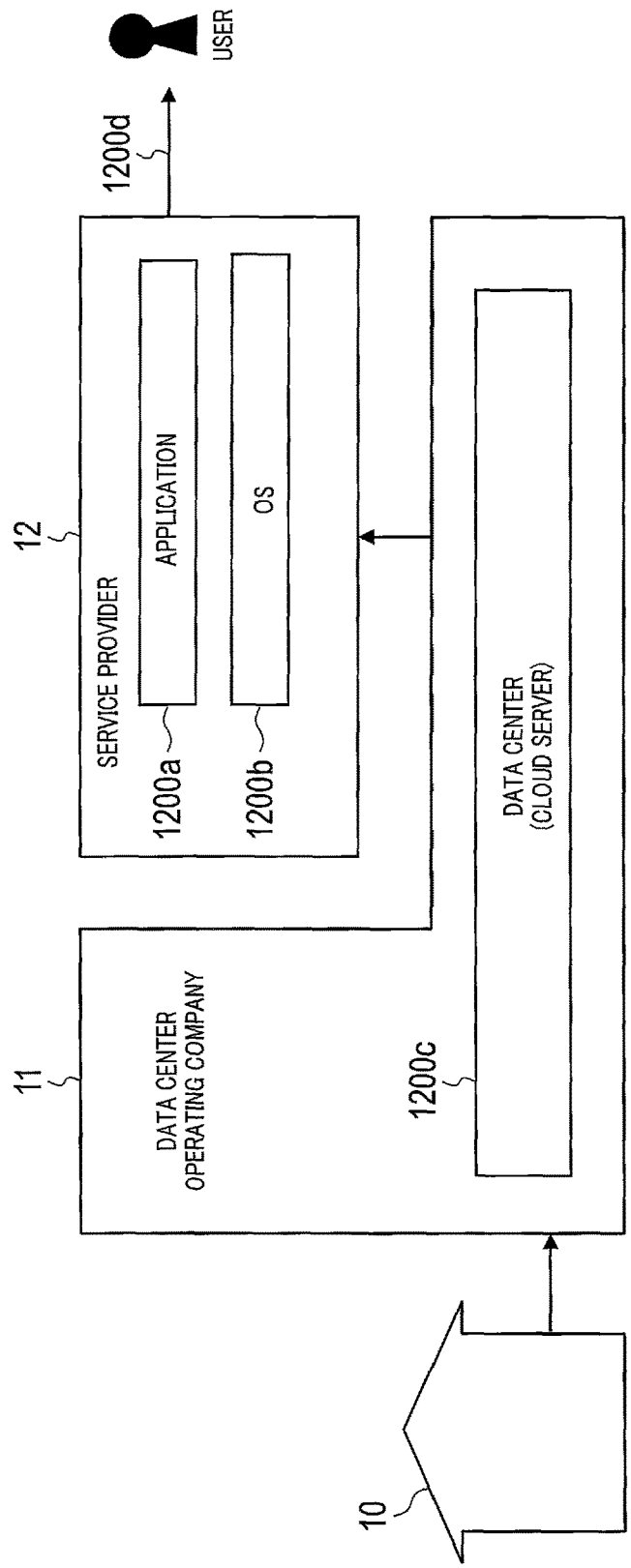
FIG. 16 is a diagram illustrating service genre 2 (type using IaaS)

FIG. 16 is a diagram illustrating service genre 2 (type using IaaS). Here, "IaaS" is an abbreviation of an "infrastructure as a service" and is a cloud service providing model that provides an infrastructure itself for constructing and operating a computer system as a service via the Internet.

In this genre, a data center operating company operates and manages a data center (cloud server 11*a*) (1200*c*). Service provider 12 manages an OS (1200*b*) and an application (1200*a*). Service provider 12 provides a service (1200*d*) using the OS (1200*b*) and the application (1200*a*) under the management of service provider 12.

(Service Genre 3: Type Using PaaS)

Figure 17:
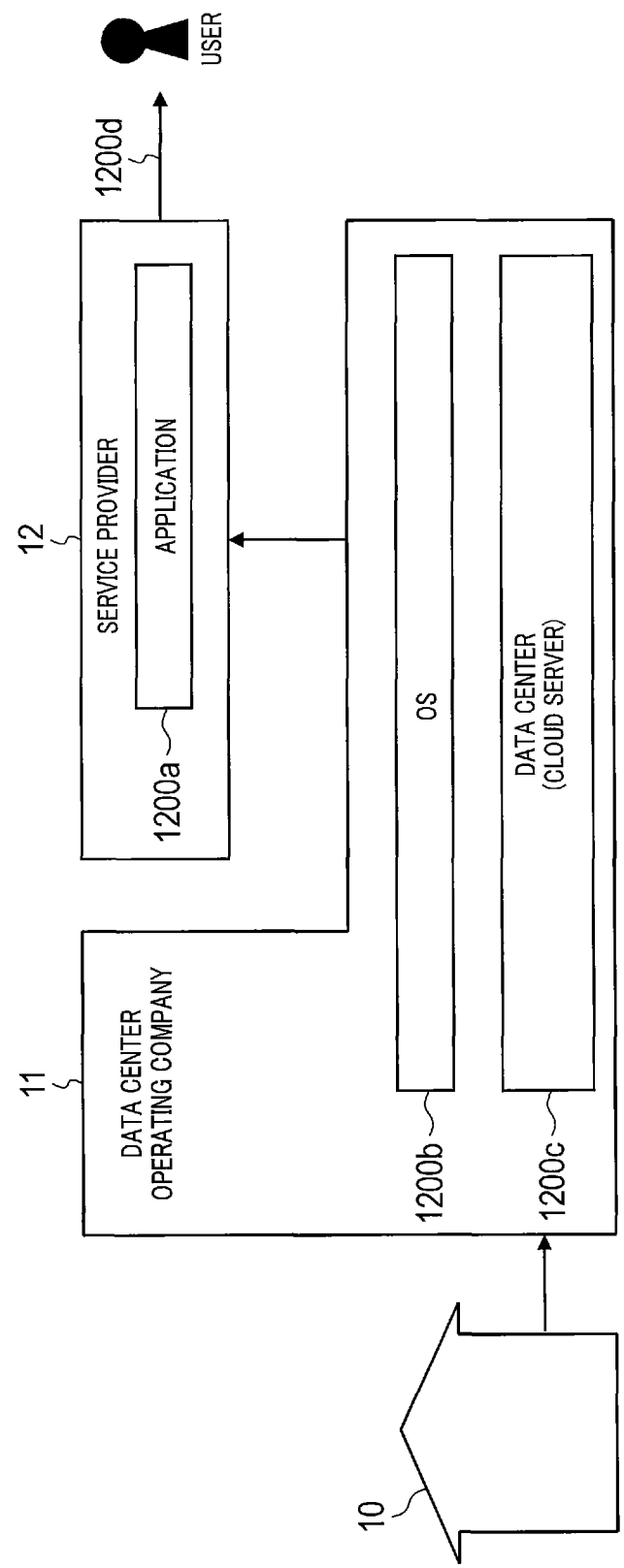
FIG. 17 is a diagram illustrating service genre 3 (type using PaaS)

FIG. 17 is a diagram illustrating service genre 3 (type using PaaS). Here, "PaaS" is an abbreviation of a "platform as a service" and is a cloud service providing model that provides a platform that forms the basis for constructing and operating software as a service via the Internet.

In this genre, data center operating company 11 manages an OS (1200*b*), and operates and manages a data center (cloud server 11*a*) (1200*c*). Service provider 12 manages an application (1200*a*). Service provider 12 provides a service (1200*d*) using the OS (1200*b*) under the management of the data center operating company and the application (1200*a*) under the management of service provider 12.

(Service Genre 4: Type Using SaaS)

Figure 18:
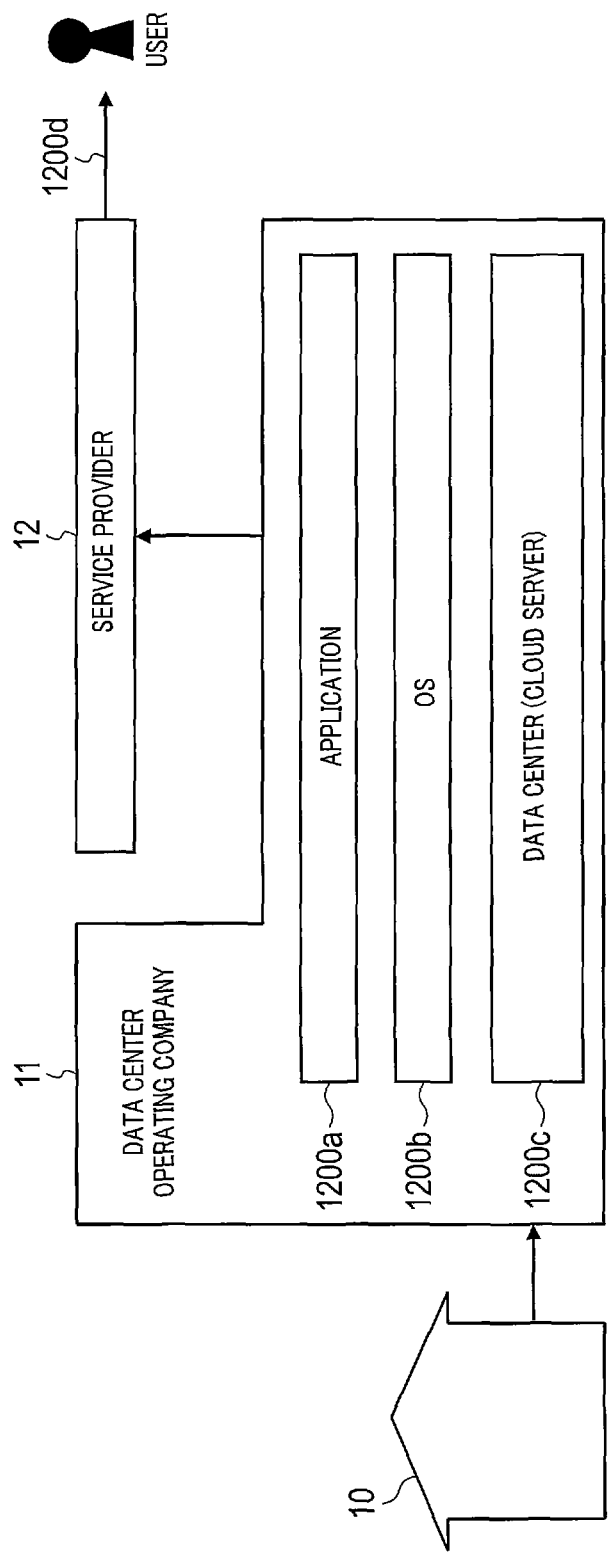
FIG. 18 is a diagram illustrating service genre 4 (type using SaaS).

FIG. 18 is a diagram illustrating service genre 4 (type using SaaS). Here, "SaaS" is an abbreviation of "software as a service." For example, this is a cloud service providing model having a function that allows a company/individual (user) owning no data center (cloud server) to use, via a network such as the Internet, an application provided by a platform provider owning a data center (cloud server).

In this genre, data center operating company 11 manages an application (1200*a*), manages an OS (1200*b*), and operates and manages a data center (cloud server 11*a*) (1200*c*). Service provider 12 provides a service (1200*d*) using the OS (1200*b*) and the application (1200*a*) under the management of data center operating company 11.

In all these genres, service provider 12 is assumed to perform service providing action. For example, the service provider or data center operating company may develop an OS, application or database of big data or the like by itself or may outsource the development to a third party.

The disclosures of the specifications, drawings and abstracts in U.S. Patent Application No. 61/706,402, filed on Sep. 27, 2012 and Japanese Patent Application No. 2013-174412, filed on Aug. 26, 2013, are incorporated herein by reference in their entireties.

INDUSTRIAL APPLICABILITY

The server apparatus and the terminal apparatus according to the present invention are suitable for use in a system that indicates recommendation information associated with maintenance of a device.

REFERENCE SIGNS LIST 1, 2 User
10 Group
10a, 100, 200, 900, 1000 Device
10b Home gateway
11 Data center operating company
11a Cloud server
12 Service provider
12a Server
101, 201 Input section
102, 202, 909, 1009 Indication section
103, 203, 502 Storage section
104, 204, 501 Information transmitting/receiving section
105, 205 Information processing section
300, 400 Communication apparatus
500, 901 Server apparatus
503 Remaining life determining section
504 Transmission destination determining section
505 Information generating section
600 Network
700, 701, 702, 703, 704, 800, 801, 802, 803 Button
902 Device information transmitting section
903 Device information receiving section
904 Device information storage section
905 Device remaining life analysis section
906 Recommendation information generating section
907 Recommendation information transmitting section
908, 1008 Recommendation information receiving section
1100 Computer
1101 Input apparatus
1102 Output apparatus
1103 CPU (Central Processing Unit)
1104 ROM (Read Only Memory)
1105 RAM (Random Access Memory)
1106 Storage apparatus
1107 Reading apparatus
1108 Network card
1109 Bus
1200a Application
1200b OS
1200c Data center (cloud server)
1200d Provision of service

The invention claimed is:

1. A server apparatus comprising control circuitry and a storage device, the control circuitry operative to:
receive operation information of a first device;
store, in the storage device, the operation information and relationship information indicating a relationship between a user of the first device and people other than the user;
read the operation information from the storage device and determine a remaining life of the first device or a part making up the first device based on the read operation information;
read the relationship information from the storage device;
determine, among the people other than the user, a person concerned who has a predetermined relationship with the user of the first device, based on the relationship information, when the determined remaining life reaches a predetermined remaining life or becomes shorter than the predetermined remaining life;
receive transmission destination restriction information indicating a range of people to which transmission of maintenance information of the first device is allowed;
determine the person concerned based on the transmission destination restriction information;
determine a second device owned by the person concerned as a transmission destination to which the maintenance information is transmitted; and
transmit the maintenance information to the second device, wherein
the maintenance information is information prompting maintenance of the first device or the part making up the first device, and the maintenance information includes an activation button that is pressed by the person concerned and that activates a function for establishing communication with the user of the first device.

2. The server apparatus according to claim 1, wherein the transmission destination restriction information is information indicating the range of people to which transmission of the maintenance information is allowed for devices of the user, including the first device.

3. The server apparatus according to claim 1, wherein the control circuitry is further operative to: generate the maintenance information, wherein the control circuitry receives content restriction information indicating information allowed to be included in the maintenance information, and selects information used to generate the maintenance information from among the information allowed to be included in the maintenance information based on the content restriction information.

4. The server apparatus according to claim 1, wherein the control circuitry receives information at one security level selected from among a plurality of security levels that gradually restrict the range of people to which transmission of the maintenance information is allowed as the transmission destination restriction information.

5. The server apparatus according to claim 1, wherein the function is a function for requesting a maintenance provider to perform maintenance of the first device.

6. The server apparatus according to claim 1, wherein the maintenance information further includes information relating to maintenance of the second device or another device owned by the person concerned.

7. The server apparatus according to claim 6, wherein the function is a function for requesting a maintenance provider to perform maintenance of the second device or the another device owned by the person concerned.

8. A terminal apparatus that receives the maintenance information from the server apparatus according to claim 1 and outputs the received maintenance information.

9. A terminal apparatus comprising control circuitry and a storage device, the control circuitry operative to:
receive, when a remaining life of a first device reaches a predetermined remaining life or becomes shorter than the predetermined remaining life, (i) maintenance information of the first device whose transmission destination is determined, based on relationship information indicating a relationship between a user of the first device and people other than the user, to be a second device owned by a person concerned, among the people other than the user, having a predetermined relationship with the user of the first device, and (ii) transmission destination restriction information indicating a range of people to which transmission of the maintenance information is allowed, the person concerned being determined based on the received transmission destination restriction information;

store, in the storage device, the received maintenance information;

read the maintenance information from the storage section; and output the read maintenance information, wherein the maintenance information is information prompting maintenance of the first device or a part making up the first device, and the maintenance information includes an activation button that is pressed by the person concerned and that activates a function for establishing communication with the user of the first device.

10. The terminal apparatus according to claim 9, wherein the person concerned is determined from among the range of people to which transmission of the maintenance information is allowed based on the transmission destination restriction information indicating a range of transmission destinations to which transmission of the maintenance information is allowed.

11. The terminal apparatus according to claim 10, wherein the transmission destination restriction information is information indicating the range of people to which transmission of the maintenance information is allowed for devices of the user, including the first device.

12. The terminal apparatus according to claim 10, wherein information to be used to generate the maintenance information is selected from information allowed to be included in the maintenance information based on content restriction information indicating the information allowed to be included in the maintenance information.

13. The terminal apparatus according to claim 10, wherein the transmission destination restriction information is information at one security level selected from among a plurality of security levels that gradually restrict the range of people to which transmission of the maintenance information is allowed.

14. The terminal apparatus according to claim 9, wherein the function is a function for requesting a maintenance provider to perform maintenance of the first device.

15. The terminal apparatus according to claim 9, wherein the maintenance information further includes information relating to maintenance of the second device owned by the person concerned or another device owned by the person concerned.

16. The terminal apparatus according to claim 15, wherein the function is a function for requesting a maintenance provider to perform maintenance of the second device owned by the person concerned or another device owned by the person concerned.

17. A maintenance information transmission method, the method being performed by a processor and comprising:
receiving operation information of a first device;
reading the operation information from a storage device that stores the operation information and stores relationship information indicating a relationship between a user of the first device and people other than the user and determining a remaining life of the first device or a part making up the first device based on the read operation information;
reading the relationship information from the storage device;
determining, among the people other than the user, a person concerned who has a predetermined relationship with the user of the first device, based on the relationship information, when the remaining life determined in the determining of the remaining life reaches a predetermined remaining life or becomes shorter than the predetermined remaining life;
receiving transmission destination restriction information indicating a range of people to which transmission of maintenance information of the first device is allowed;
determining the person concerned based on the transmission destination restriction information;
determining a second device owned by the person concerned as a transmission destination to which the maintenance information is transmitted; and
transmitting the maintenance information to the second device, wherein
the maintenance information is information prompting maintenance of the first device or the part making up the first device, and the maintenance information includes an activation button that is pressed by the person concerned and that activates a function for establishing communication with the user of the first device.

18. A non-transitory computer-readable storage medium with an executable program that causes a processor to execute processing comprising:
receiving operation information of a first device;
reading the operation information from a storage device that stores the operation information and stores relationship information indicating a relationship between a user of the first device and people other than the user and determining a remaining life of the first device or a part making up the first device based on the read operation information;
reading the relationship information from the storage device;
determining, among the people other than the user, a person concerned who has a predetermined relationship with the user of the first device, based on the relationship information, when the remaining life determined in the determining of the remaining life reaches a predetermined remaining life or becomes shorter than the predetermined remaining life;
receiving transmission destination restriction information indicating a range of people to which transmission of maintenance information of the first device is allowed;
determining the person concerned based on the transmission destination restriction information;
determining a second device owned by the person concerned as a transmission destination to which the maintenance information is transmitted; and
transmitting the maintenance information to the second device, wherein
the maintenance information is information prompting maintenance of the first device or the part making up the first device, and the maintenance information includes an activation button that is pressed by the person concerned and that activates a function for establishing communication with the user of the first device.

* * * * *